US005421730A

United States Patent [19]

Lasker, III et al.

[11] Patent Number: 5,421,730

[45] Date of Patent: Jun. 6, 1995

[54] INTERACTIVE LEARNING SYSTEM PROVIDING USER FEEDBACK

[75] Inventors: Harry M. Lasker, III, Cambridge; Jesse M. Heines, Chelmsford, both of Mass.

[73] Assignee: National Education Training Group, Inc., Nev.

[21] Appl. No.: 799,397

[22] Filed: Nov. 27, 1991

[51] Int. Cl.[6] .............................................. G09B 19/00

[52] U.S. Cl. .................................... 434/118; 434/323; 434/327

[58] Field of Search ............... 434/118, 167, 169, 219, 434/227, 308, 309, 322, 323, 327, 335

[56] References Cited

U.S. PATENT DOCUMENTS

| | | | |
|---|---|---|---|
| 4,337,047 | 6/1982 | Hatta | 434/201 |
| 4,541,056 | 9/1985 | Matthews | 364/300 |
| 4,617,643 | 10/1986 | Klock et al. | 364/900 |
| 4,622,013 | 11/1986 | Cerchio | 434/118 |
| 4,637,797 | 1/1987 | Whitney et al. | 434/118 |
| 4,690,644 | 9/1987 | Flanders et al. | 434/227 |
| 4,701,130 | 10/1987 | Whitney et al. | 434/118 |
| 4,772,206 | 9/1988 | Kerr et al. | 434/118 |
| 4,798,543 | 1/1989 | Spiece | 434/323 |
| 4,965,741 | 10/1990 | Winchell et al. | 364/513 |
| 4,968,257 | 11/1990 | Yalen | 434/308 |
| 4,989,145 | 1/1991 | Kyushima | 364/419 |
| 5,120,230 | 6/1992 | Clark et al. | 434/307 |
| 5,179,658 | 1/1993 | Izawa et al. | 395/164 |

OTHER PUBLICATIONS

Foulk, P. W., "Computer-aided Digital Synthesiser", Conference on Computer Systems & Technology, IEEE, Oct. 28-31 1974 pp. 144-149.

*Primary Examiner*—Jessica J. Harrison
*Attorney, Agent, or Firm*—Dressler, Goldsmith, Shore & Milnamow, Ltd.

[57] ABSTRACT

An interactive learning system for providing various modes of instruction relating to a syntax-intensive subject matter such as a computer program language. The modes of instruction may include a video lesson mode of instruction, a reference text mode of instruction and a syntax analysis mode of instruction in which the user attempts to answer questions presented by the system. The user's entries are analyzed for proper syntax and if any errors are found therein, the user is provided visual feedback relating to any errors found in the entries.

18 Claims, 16 Drawing Sheets

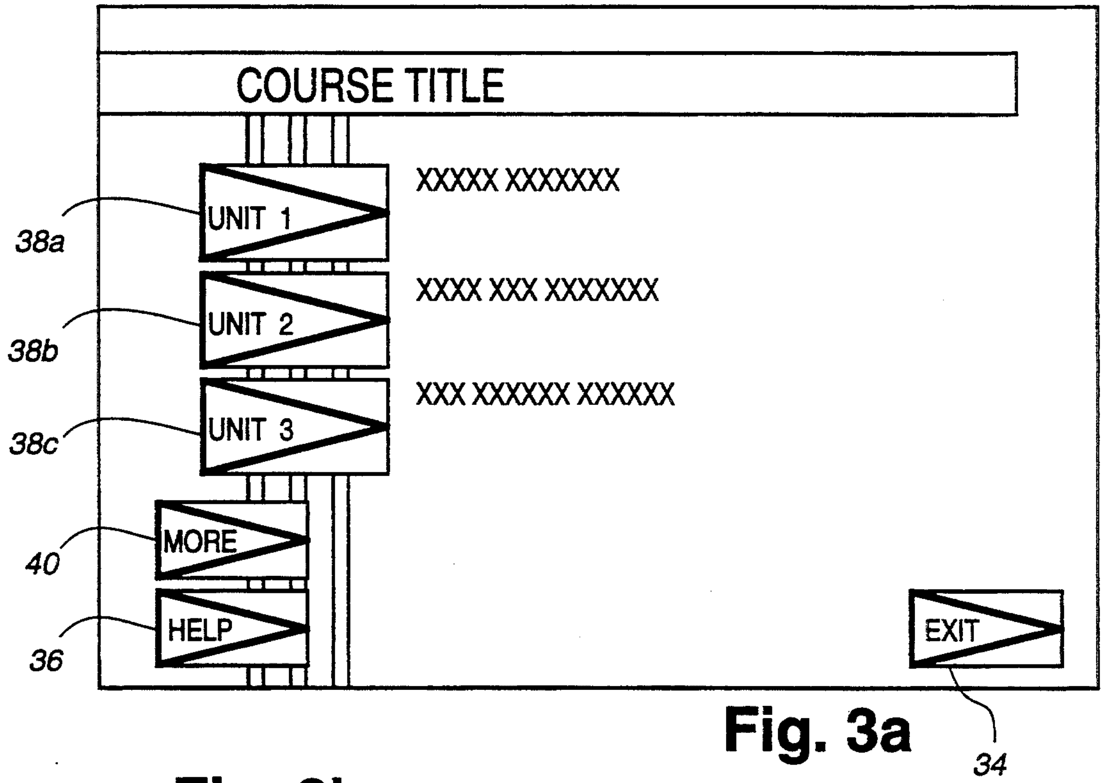
Fig. 3a
Fig. 3b
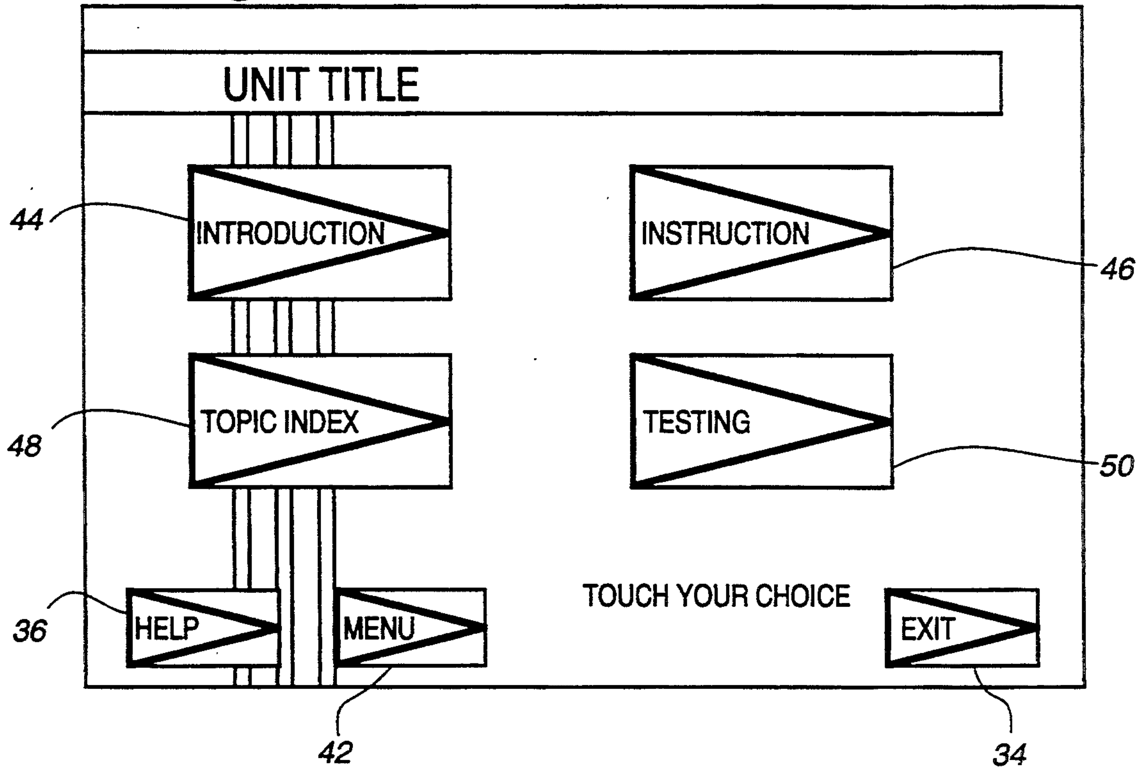

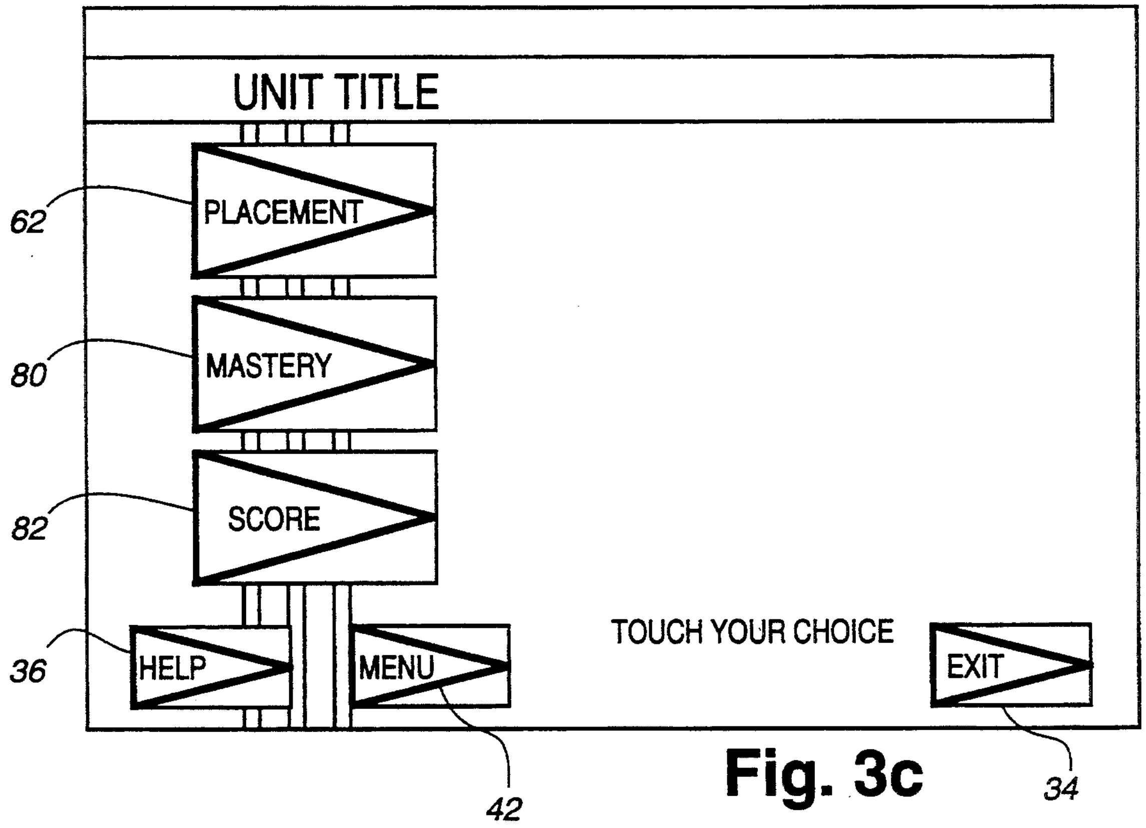
Fig. 3c
Fig. 3d
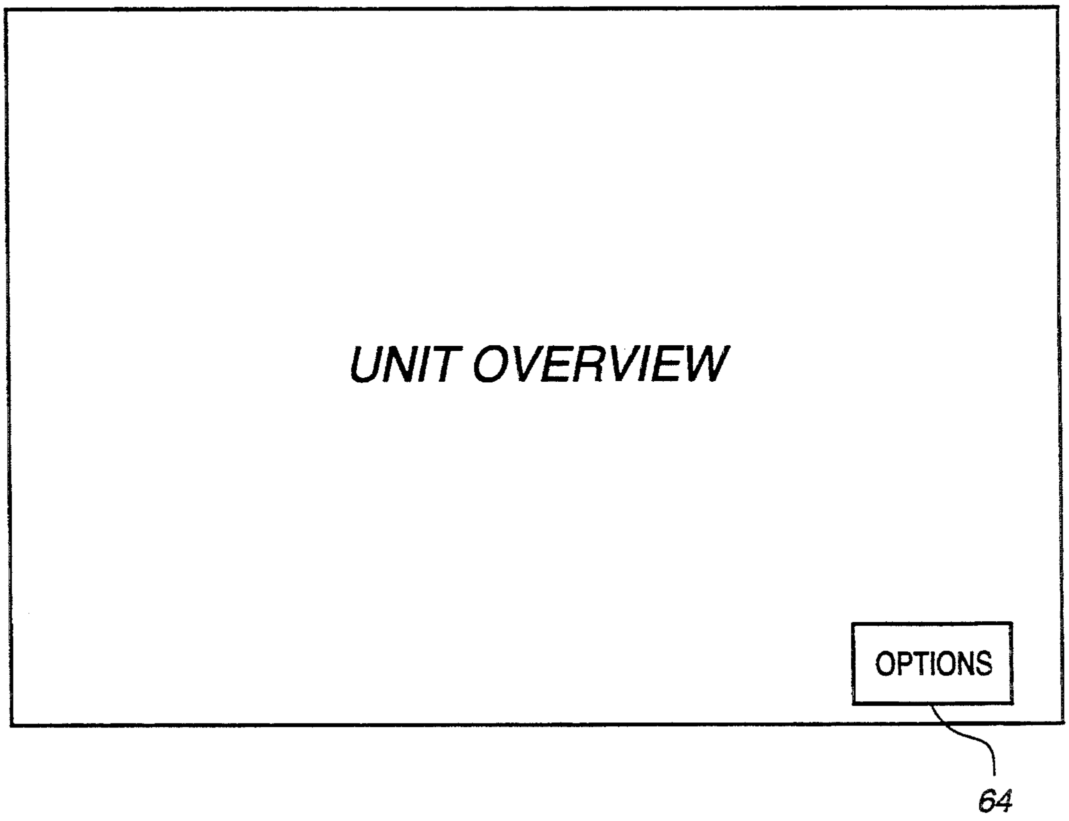

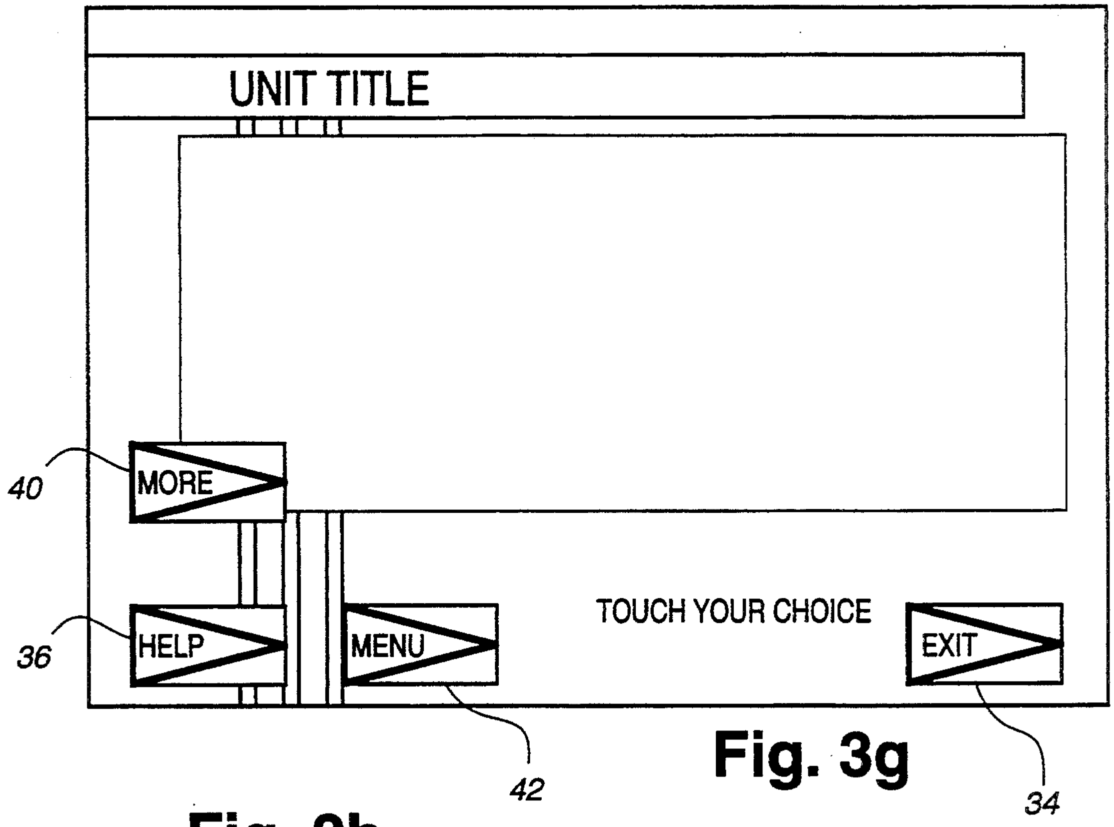
Fig. 3g
Fig. 3h
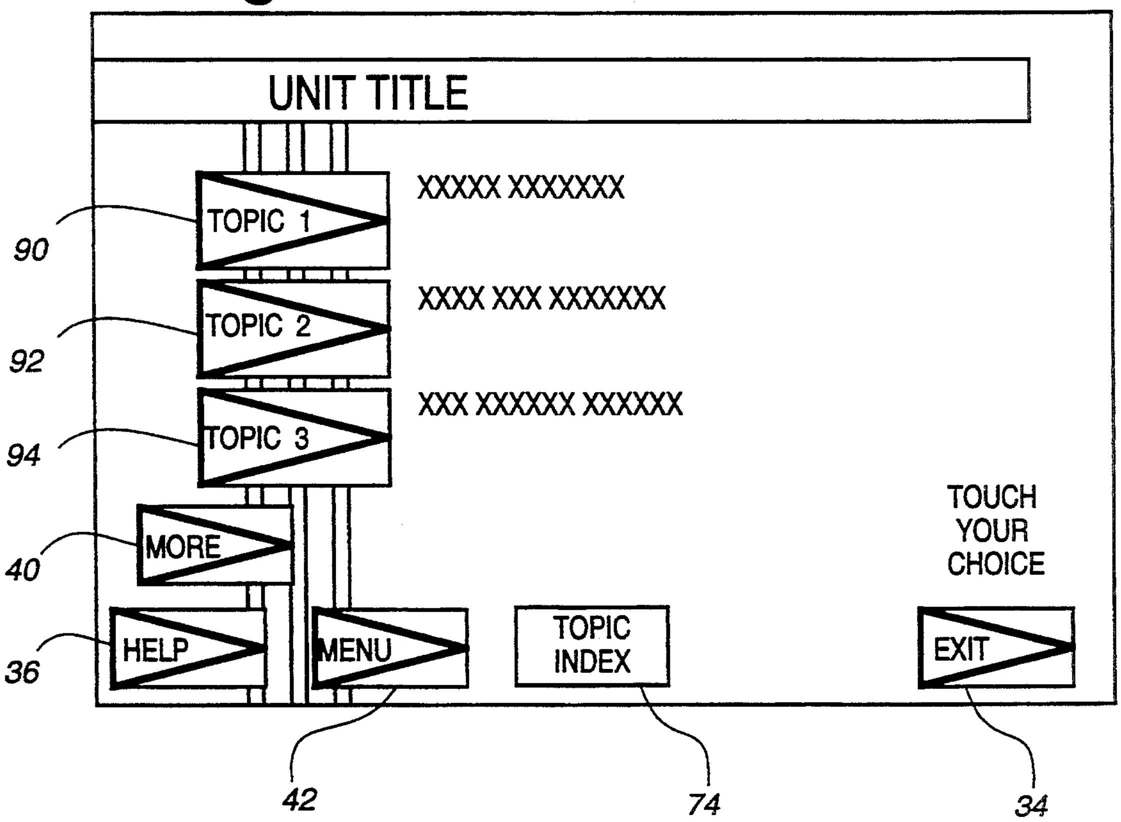

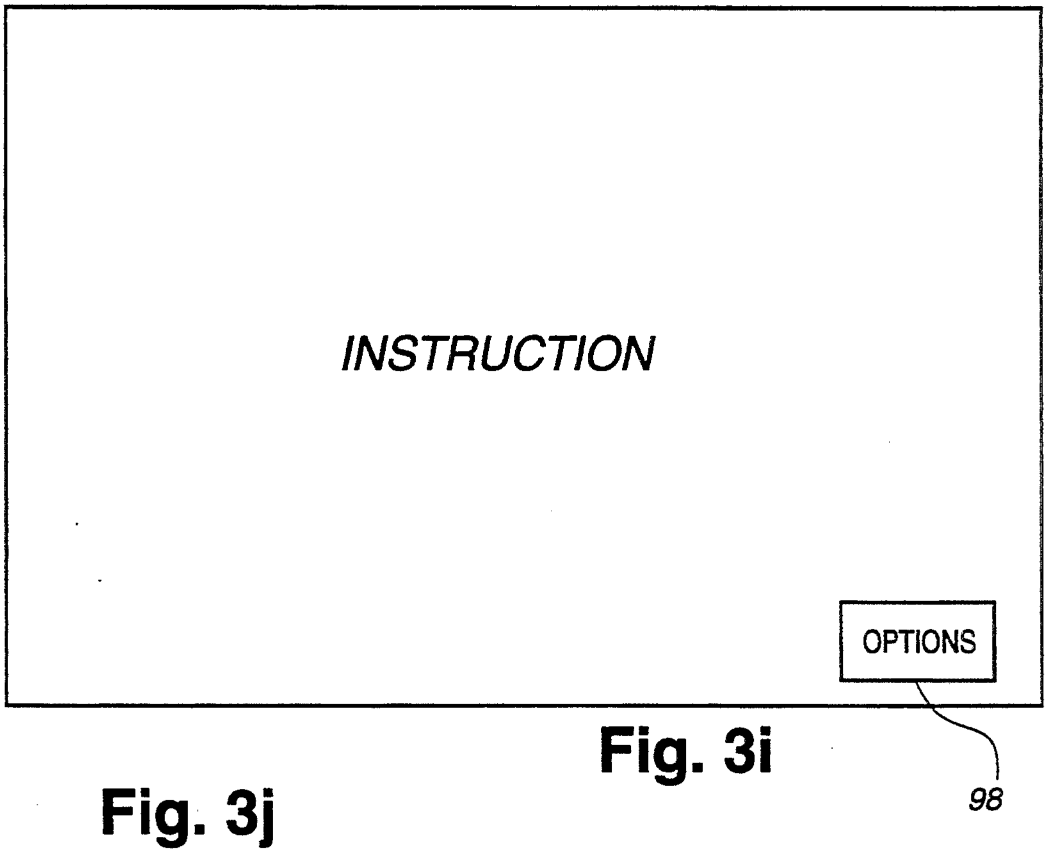
Fig. 3i
Fig. 3j
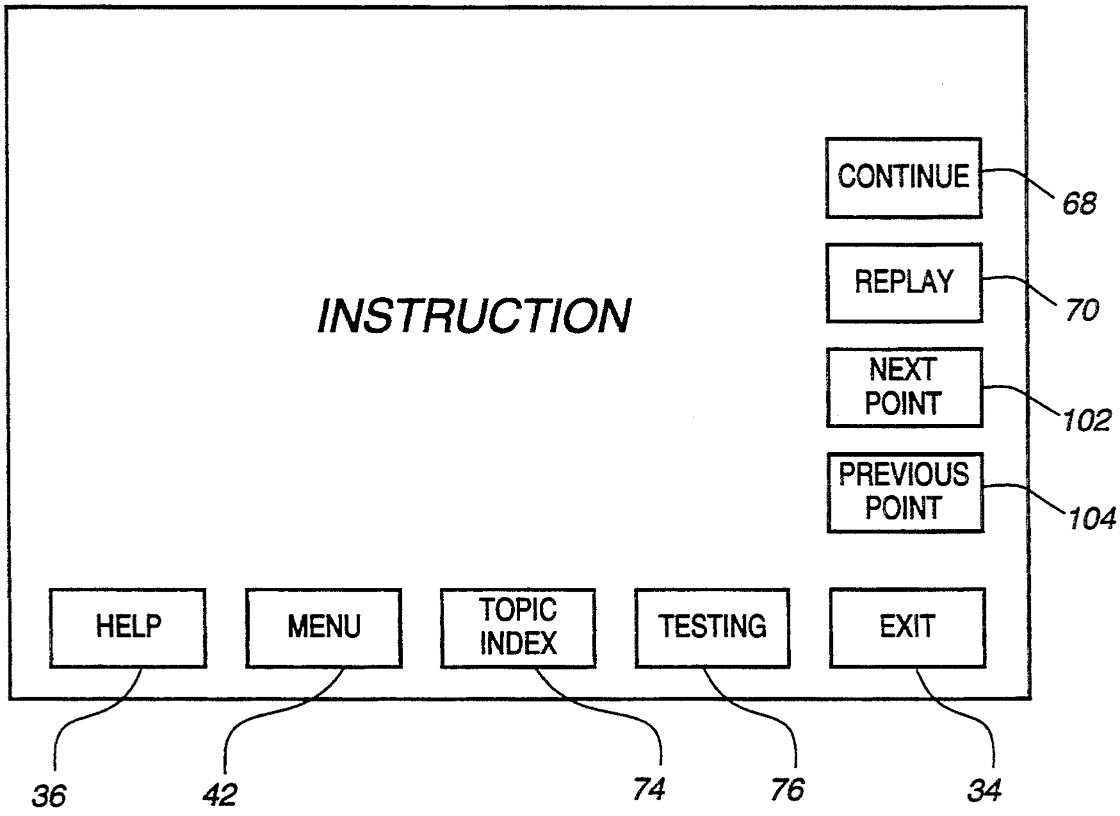

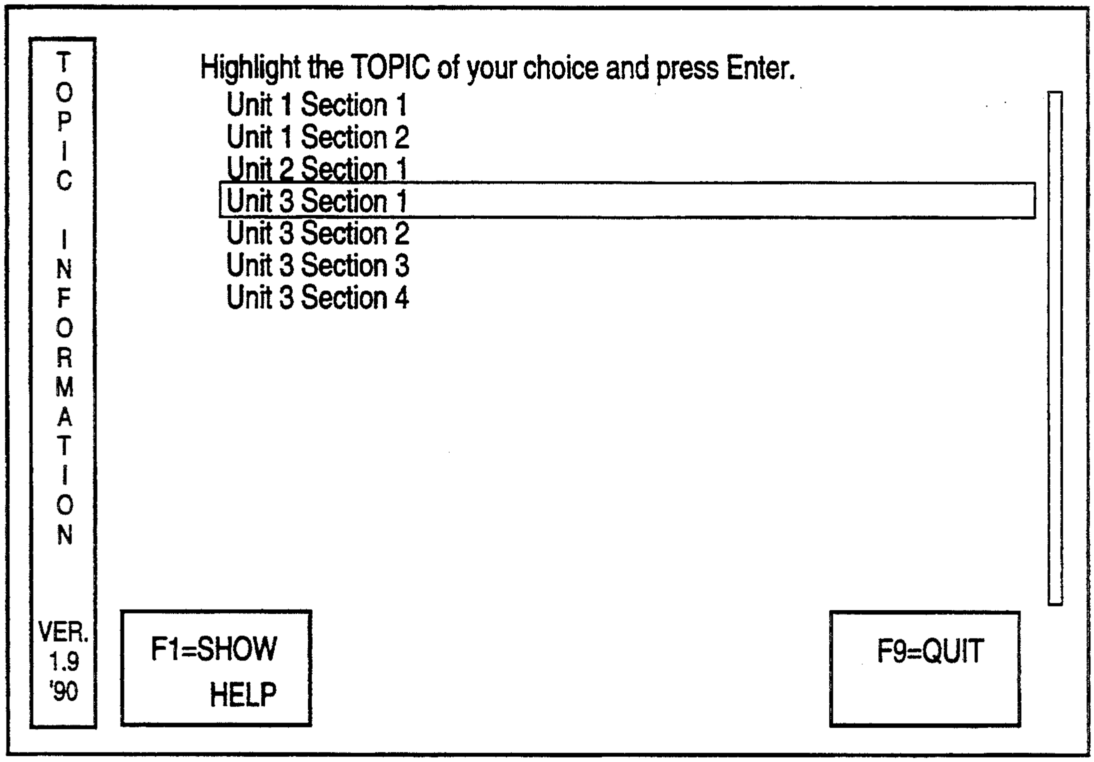
Fig. 4a
Fig. 4b
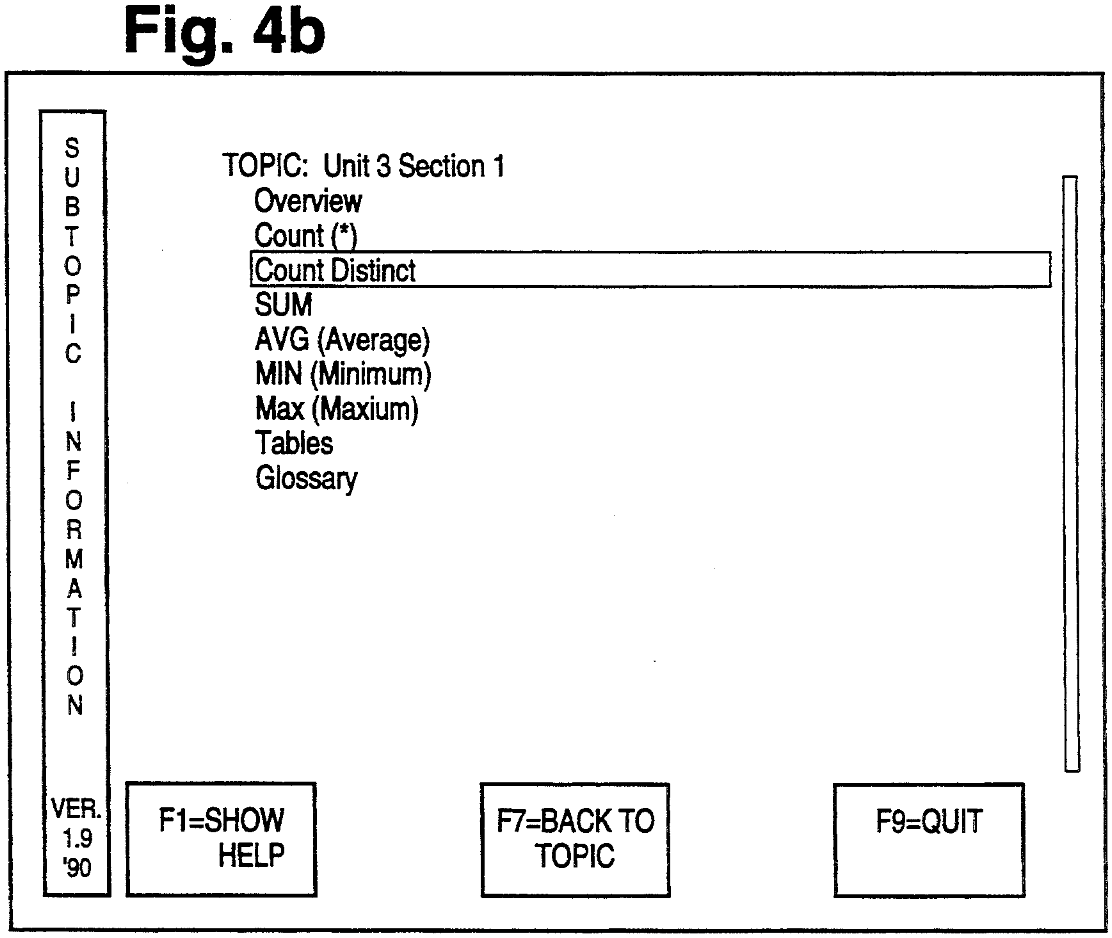

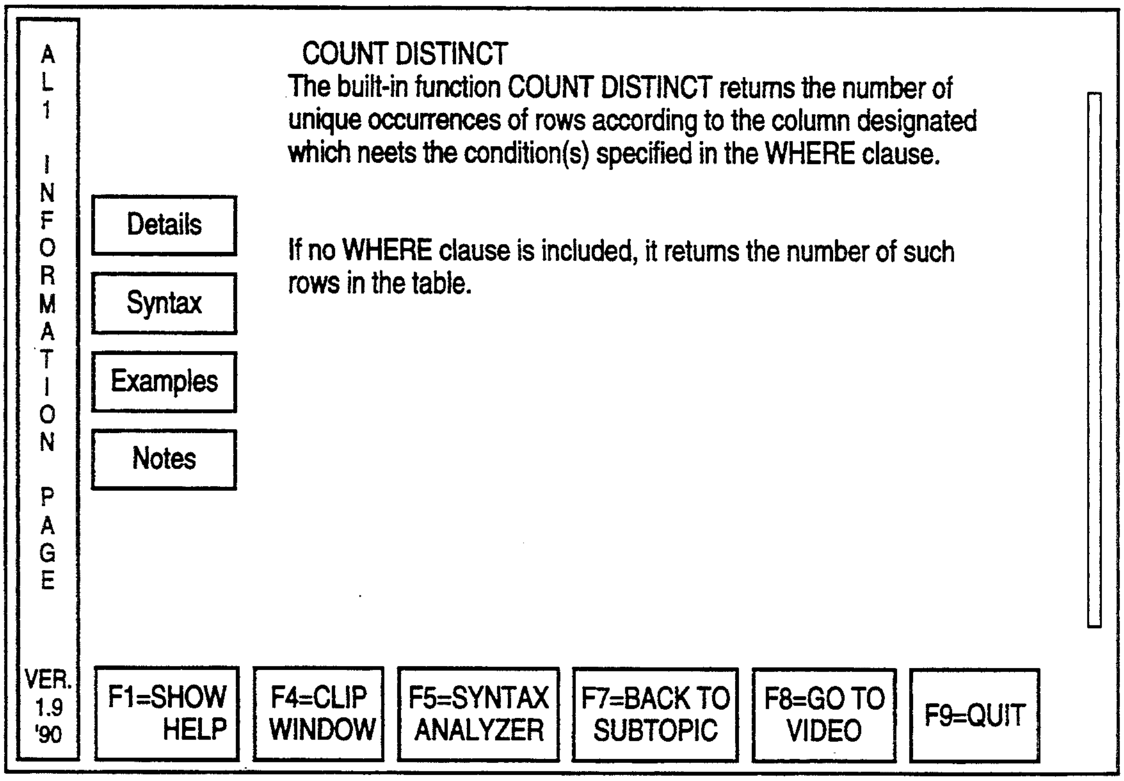
Fig. 4c
Fig. 5
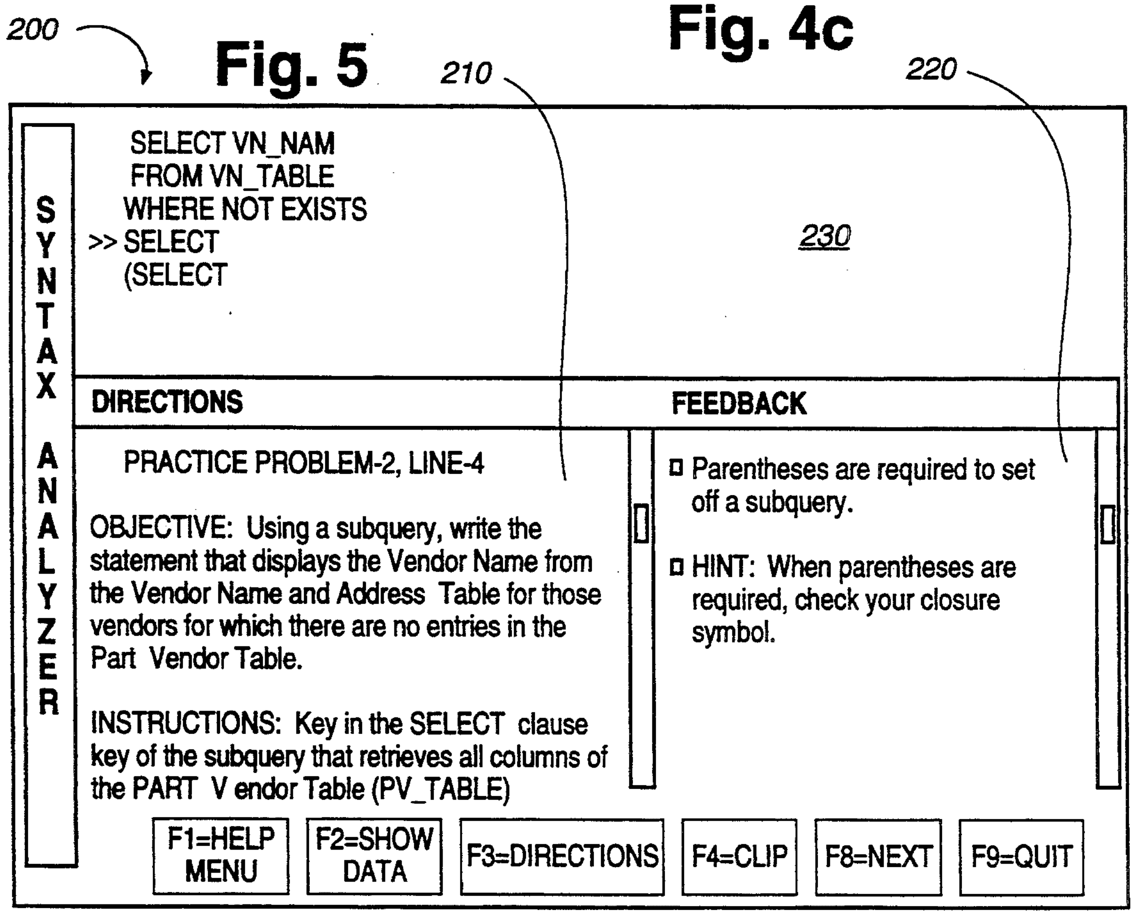

PROBLEM DEFINITION FILE FIELDS

| Field Type | Field Identifier | Field Content |
|---|---|---|
| Problem identif. | <problem-id> | alphanumeric string |
| Problem prompt | <problem-prompt> | text |
| Prompt line | <prompt-line> | line number |
| Token | <token> | single entry |
| | <token, same-order> | multiple entry |
| | <token, any-order> | multiple entry |
| | <token, commutable> | multiple entry |
| | <token, one-of> | multiple entry |
| | <token,optional> | single entry |
| | <token, optional, contingent> | single entry |
| | <token, space, required> | none |
| | <token, space, allowed> | none |
| | <token, space, not-allowed> | none |
| Rule | <rule> | text |
| | <rule, file> | filename, data-id |
| Hint | <hint> | text |
| | <hint, file> | filemane, data-id |
| Answer | <answer> | text |
| Data display | <data> | text |
| | <data, file> | filename, data-id |
| Comment | <comment> | text |
| End-of-problem | <eop> | none |

Fig. 6

PROBLEM DEFINITION FILE

<problem-id> us4s2p9

<problem-prompt> PRACTICE PROBLEM - 2, LINE - 4

OBJECTIVE: Using a subquery, write the statement tha displays the Vendor Name from theVendor Name and Address Table for those vendors for which there are no entries in thePart Vendor Table.

INSTRUCTIONS: Key in the SELECT clause of the subquery that retrieves all columns of the Part Vendor Table (PV_TABLE).

<prompt-line>4

<token> (
<rule> Parentheses are required to set off a subquery.
<hint> When parentheses are required, check your closure symbol.

<token> select
<rule, file> rulib01.rul, must-begin-with-select
<hint> Check for the existence and/or correct spelling of keyword.

<token, space, required>

<token> *
<rule> An asterisk is necessary to count all rows that meet specified condition(s).
<hint> Provide a symbol that selects all data that meet specified condition(s).

<answer> (SELECT *

<data, file> DATLIB01.TBL, table2-3

<eop>

Fig. 7

INTERACTIVE LEARNING SYSTEM PROVIDING USER FEEDBACK

BACKGROUND OF THE INVENTION

The present invention relates to an interactive learning system for use in learning syntax-intensive subject matter, such as a computer programming language, which analyzes user entries for syntactical correctness and generates user feedback information relating to errors that were made in the user entries.

Conventional interactive learning systems are in relatively widespread use for learning computer programs of all types. Those interactive learning systems are used either as the primary mode of education or as supplementary education for reinforcing previously received instruction, such as classroom instruction.

A conventional learning system may present instruction to the user, or student, relating to the application program being learned, and the system may also quiz the student by requesting that he or she make program entries in response to questions generated by the system. In response to a student's entry, the system typically responds by generating only an indication to the student whether the student's entry was correct or incorrect. Because the system provides only that minimal feedback information, the use of such conventional interactive learning systems may be a frustrating experience, particularly when the computer program being learned incorporates arcane syntactical rules of construction.

Conventional interactive learning systems are also relatively limited in the type of instruction that they provide. Some systems may provide lessons relating to the computer program being learned without reinforcing those lessons with other modes of instruction. Other systems may provide other modes of instruction, but typically they fail to provide a number of different modes of instruction, and thus are unduly limited in the effectiveness of the training provided.

SUMMARY OF THE INVENTION

The invention is directed to an interactive learning system for providing interactive instruction relating to syntax-intensive subject matter. The system generates questions to the student, analyzes the student's entries made in response for syntactical correctness, and generates helpful feedback information to the student relating to the student's entries.

The architecture of the interactive learning system is advantageously designed so that the portion of the system that analyzes the syntactical correctness of the student's entries may be easily adapted to accommodate different subject matters, such as different computer programs.

An interactive learning system in accordance with the invention may also provide a number of different modes of instruction, the use of which provides a particularly effective learning experience to the student. The various modes include one instruction mode in which the student receives video presentations relating to various topics selected by the student. In another instruction mode, the student receives textual reference information about a topic selected by the student. In still another mode, the student may respond to queries generated by the system to test the student's knowledge gained from the other modes of instruction provided by the system.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIGS. 3*a*–3*k* illustrate a number of display screens generated during operation of the system;

FIGS. 4*a*–4*c* illustrate a number of display screens generated during the reference center mode of instruction;

FIG. 5 illustrates an exemplary display screen generated during the syntax analysis mode of instruction;

FIG. 6 illustrates the data format for defining a problem generated by the system;

FIG. 7 illustrates an example of the data defining a problem as stored in the memory of the system.

DETAILED DESCRIPTION OF A PREFERRED EMBODIMENT

Figure 1:
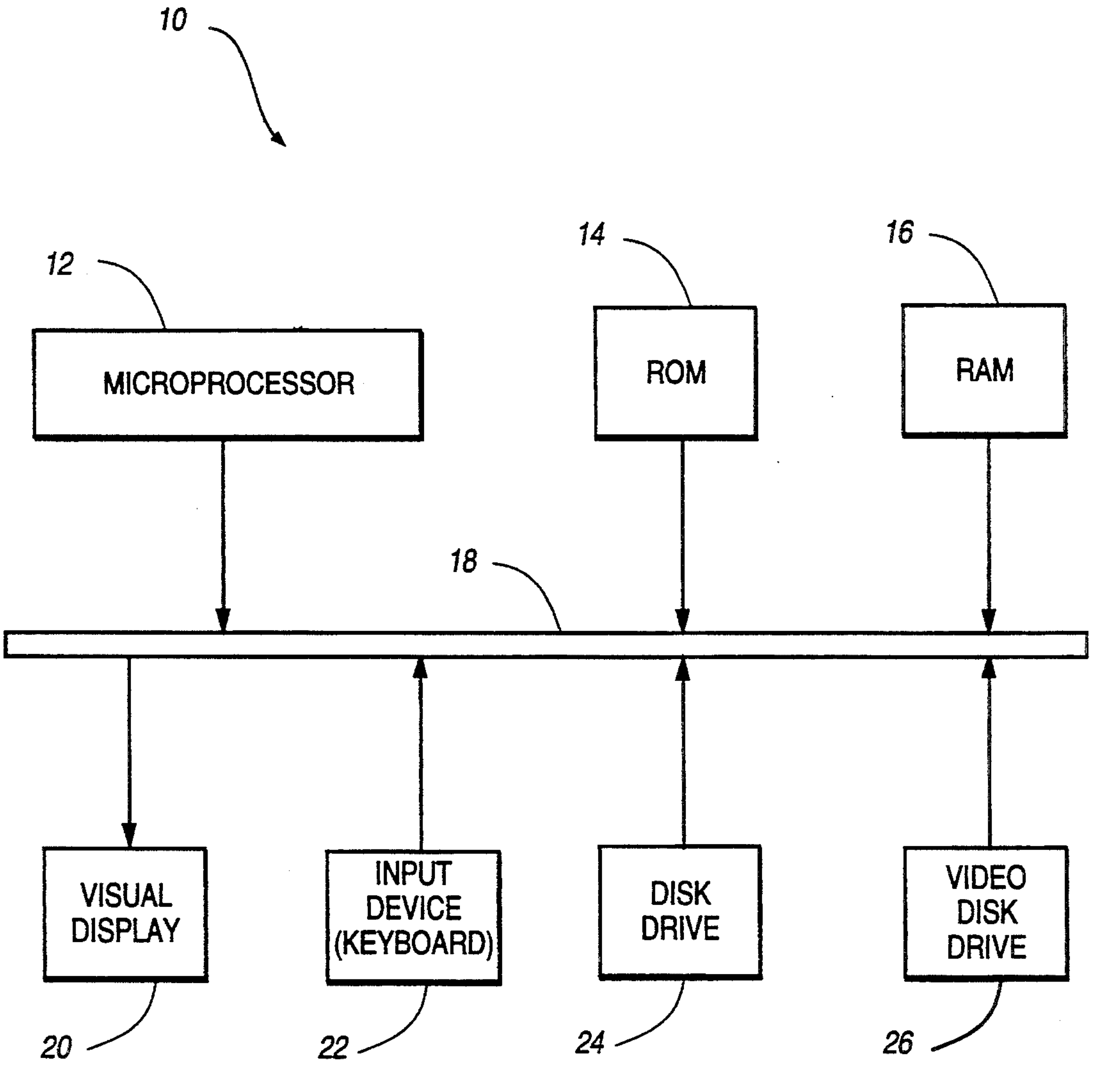
FIG. 1 is a block diagram of the electronics of a preferred embodiment of an interactive learning system in accordance with the present invention.

A preferred embodiment of an interactive learning system 10 in accordance with the invention is shown in FIG. 1. The system 10 includes a microprocessor 12 connected to a read-only memory (ROM) 14 and a random-access memory (RAM) 16 via a bus 18. A computer program that controls the operation of the interactive learning system 10 is stored in the ROM 14 and is executed by the microprocessor 12. Alternatively, if the computer program is not stored in the ROM 14, it may be input to the system from a disk drive, such as a compact-disk (CD) ROM drive.

A number of input/output (I/O) devices are operatively coupled to the microprocessor 12 via the bus 18. These I/O devices include a visual display device 20, such as a cathode ray tube (CRT), an input device 22, such as a keyboard, for allowing a student to enter data into the system, a disk drive 24 for bidirectional data communication, and a source of video 26, such as a video disk drive 26. Alternatively, other video sources, such as a CD-ROM drive, may be used to generate the video.

During operation of the system 10, high-resolution video lessons are generated on the visual display 20 from the video disk drive 26. The video disk drive also generates audio information from which a sound track is generated and provided to the user via a sound generating device, such as a speaker (not shown).

OPERATION

The interactive learning system allows a user to utilize three different types or modes of instruction: 1) interactive video/audio instruction; 2) textual reference information; and 3) practice and testing of knowledge gained through the video/audio and reference modes of instruction.

Summary of Operation

When using the interactive learning system 10, the student has great flexibility in using and selecting the three modes of instruction. A student may receive sequences of video segments, and at the end of each sequence may receive a problem that presents a question to the student. The problems are specially designed so that each problem specifically relates to the instruction provided by the video segment just finished.

In attempting to answer the question set forth in the problem by inputting an entry, the student may receive various feedback information, including rules and/or hints relating to any errors in the student's entry and visual information consisting of a movable indicator, such as an arrow, that indicates the portion of the student's entry that is being analyzed.

After the student completes a problem, the student may receive another video segment. The above process continues so that the student may receive alternate sequences of video/audio instruction and reinforcement of that instruction through testing or practice in answering questions.

If the student is in the middle of a video segment, and wishes to try the next problem without completing that segment, he or she may pause the video segment and go directly to the problem.

The system generates various video menu display screens, which as described in detail below, allow the student to specifically select the desired video instruction via hierarchical video menu displays, one menu presenting general topics and each of the general topics being further subdivided into more specific topics.

The student may also receive textual reference information relating to the subject matter for which instruction is being provided. Like the video menus just described, the reference information menus are hierarchical menus that allow the student to specifically request information relating to a desired topic. The precise manner in which the above modes of instruction can be selected by the student is described further below.

Detailed Relationship Between Operation Modes

The detailed operation of the system 10 will now be described in connection with the flow diagram of FIG. 2 and the exemplary display screens illustrated in FIGS. 3*a*–3*k*, 4*a*–4*c* and 5. It should be noted that the display screens shown in the drawings are exemplary in the sense that the screen appearance may vary depending upon the particular subject matter to be learned. Also, while the system 10 is illustrated as utilizing a touch sensitive screen that permits a user to enter commands to the system, the system 10 might alternatively utilize other types of input devices, such as a keyboard, a mouse, a light sensitive pen or any other device, as desired.

Figure 2:
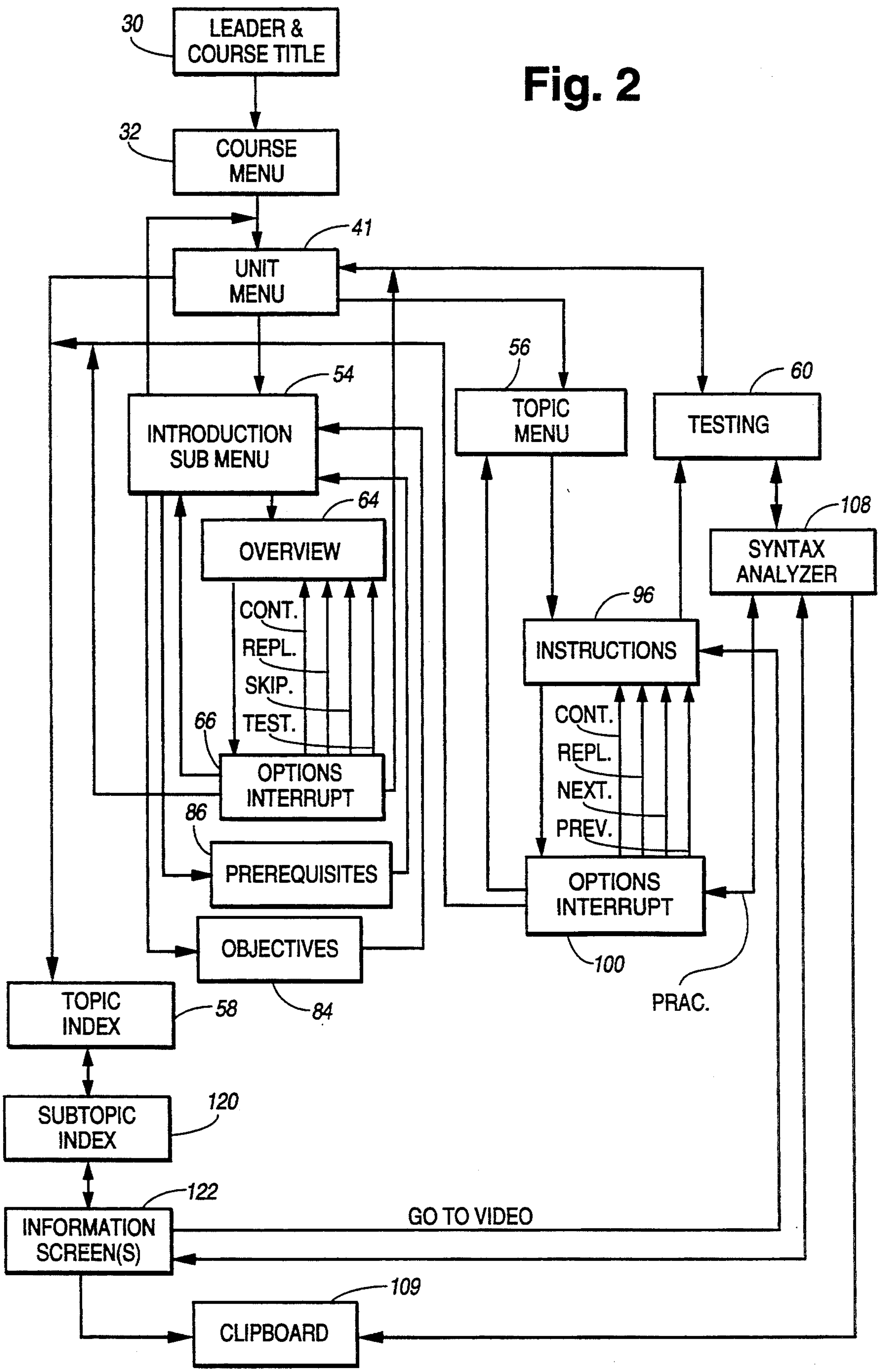
FIG. 2 is a flow diagram illustrating the interrelationships among the various modes of instruction provided by the system.

As seen in FIG. 2, once a video disk has been loaded in the disk drive 26 and the program begins execution, a step 30 causes the display 22 to display a leader and the title of the course stored on the video disk. A step 32 then develops the screen shown in FIG. 3*a* displaying the course title and permitting a student to select one of several options. In the preferred embodiment, and as noted above, the display 20 includes touch sensitive portions that may be touched or contacted by a student to select an option. As will become evident hereafter, most of the display screens permit the student to exit the program by contacting a touch sensitive portion 34 or to request help from the system 10 by contacting a touch sensitive portion 36. The student may select one of the units in the course (here shown as being three in number, although this number may change from course to course) by contacting one of three touch sensitive portions 38*a*–38*c*. If more information is to be presented than can fit on the display, the student may contact a touch sensitive portion 40, where upon a second screen (and, if .necessary, additional screen(s)) may be displayed.

Following the step 32 of FIG. 2, a step 41 causes the screen of FIG. 3*b* to be displayed. In addition to the touch sensitive portions 34 and 36, a student may contact one of five additional touch sensitive portions 42, 44, 46, 48 or 50. When the touch sensitive portion 42 is contacted, control returns to the step 41, which displays the screen of FIG. 3*a*. When a student contacts any of the touch sensitive portions 44, 46, 48 or 50, control passes to one of four steps 54, 56, 58 or 60, respectively. The step 54 causes the screen of FIG. 3*c* to be displayed. If a touch sensitive portion 62 of the screen of FIG. 3*c* is contacted, control passes to a step 64 of FIG. 2 which causes the screen of FIG. 3*d* to be displayed. At this point, video stored on the video disk is reproduced on the display 20 and audio is reproduced over the speaker to provide the student with an overview of the selected unit.

The student may control the reproduced information by contacting a touch sensitive portion 64, which causes control to pass to a step 66 of FIG. 2. The step 66 in turn causes the screen of FIG. 3*e* to be displayed. When a student contacts one of three touch sensitive portions 68, 70 or 72, control returns to the step 64 and the video disk drive 26 is commanded to cue the video, to replay a portion of the video or to skip ahead to a different portion of the video, respectively. When the student contacts one of a pair of touch sensitive portions 74 or 76, control passes to the steps 58 or 60, respectively, of FIG. 2.

Once the overview information has been reviewed by the student, control returns to the introduction submenu step 54 of FIG. 2.

Figure 3E:
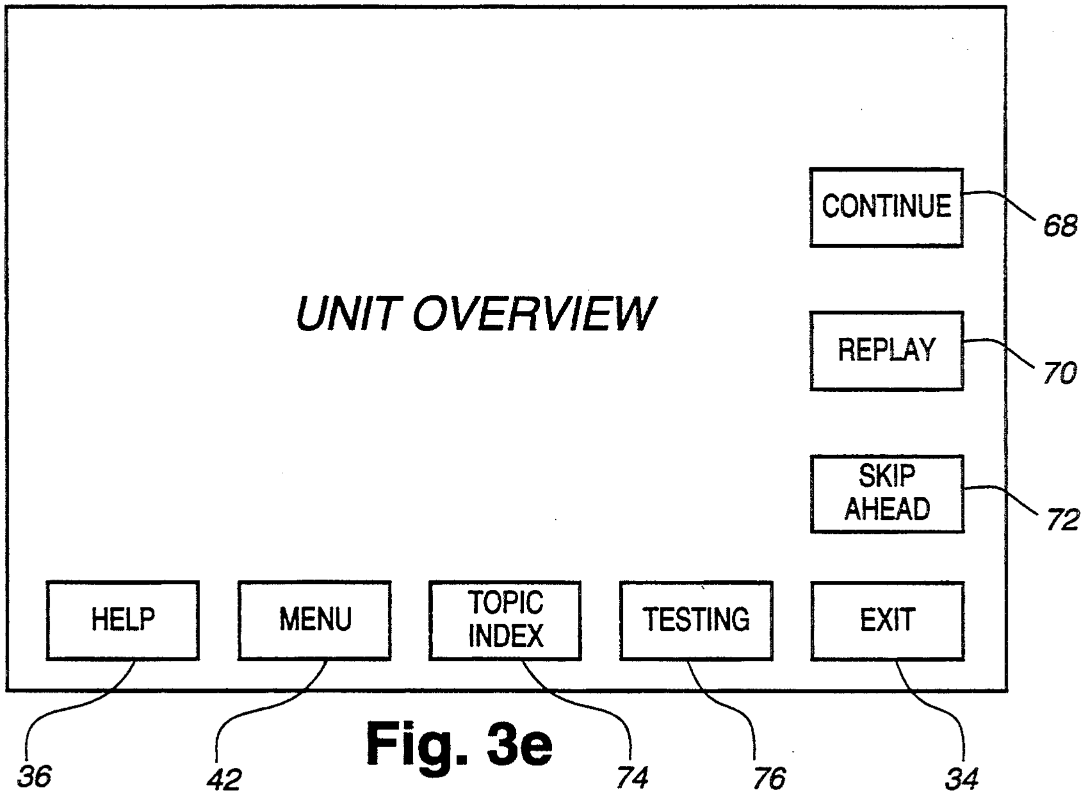
Figure 3F:
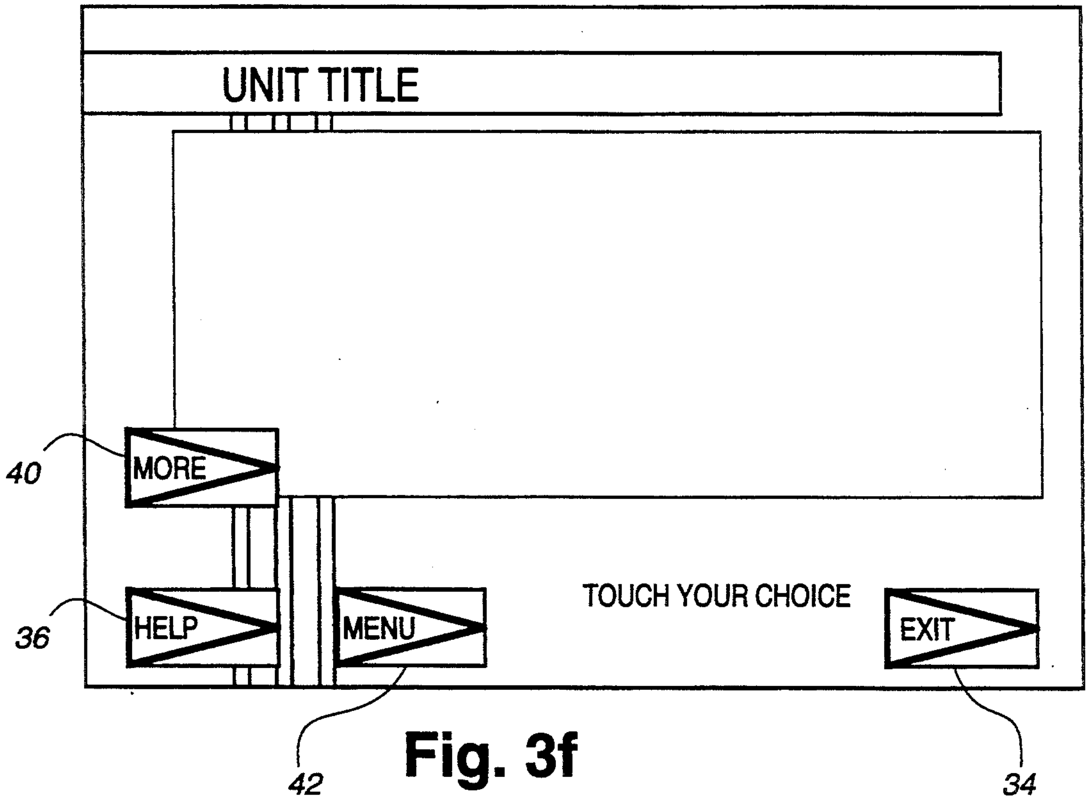

Referring again to FIG. 3*c*, when the student contacts one of a pair of touch sensitive portions 80 or 82, control passes to a step 84 or a step 86, respectively, which in turn cause the screens of FIGS. 3*f* or 3*g* to be displayed. Here, the student is presented informationconcerning the learning objectives of the unit or the learning prerequisites of the unit. Control from the steps 84 and 86 returns to the introduction submenu step 54 of FIG. 2.

Referring again to FIG. 3*b*, when the student contacts the touch sensitive portion 46, the step 56 causes the screen of FIG. 3*h* to be displayed. At this time, the student is prompted to select a topic. In the example of FIG. 3*h*, up to three topics may be selected by contacting one of three touch sensitive portions 90, 92 or 94. In actual practice, a different number of topics may be selectable by a student.

Once one of the touch sensitive portions 90–94 is contacted, control passes to a step 96, which in turn causes the screen of FIG. 3*i* to be briefly displayed. Thereafter, the video disk drive 26 is commanded to present the selected video and audio instruction to the student. During this presentation, the student may contact a touch sensitive portion 98 so that control passes to a step 100 of FIG. 2. The step 100 causes the screen of FIG. 3*j* to be displayed, in turn allowing the student to branch to other portions of the program and/or to control the video disk drive 26. More specifically, the student may contact the touch sensitive portion 68 or 70 to cue the video or to replay a portion thereof or the student may contact touch sensitive portions 102 or 104 to move the video to a later or previous point.

The student may alternatively contact a touch sensitive portion 106 that passes control to a syntax analyzer routine 108 shown schematically in FIG. 2 and described in more detail below. During operation of the syntax analyzer 108, the screen of FIG. 5 is displayed. As seen in FIG. 5, the student may request one of several options while in the syntax analyzer 108. Specifically, the student may: (1) request help or directions; (2) show the results of prior testing; (3) request that data be stored in a clipboard 109; (4) move to the next practice problem; or (5) exit the program. Control from the analyzer 108 returns to the step 100, at which point the student can return to the topic menu step 56 by contacting the touch sensitive portion 42 or select a different option, as desired.

Figure 3K:
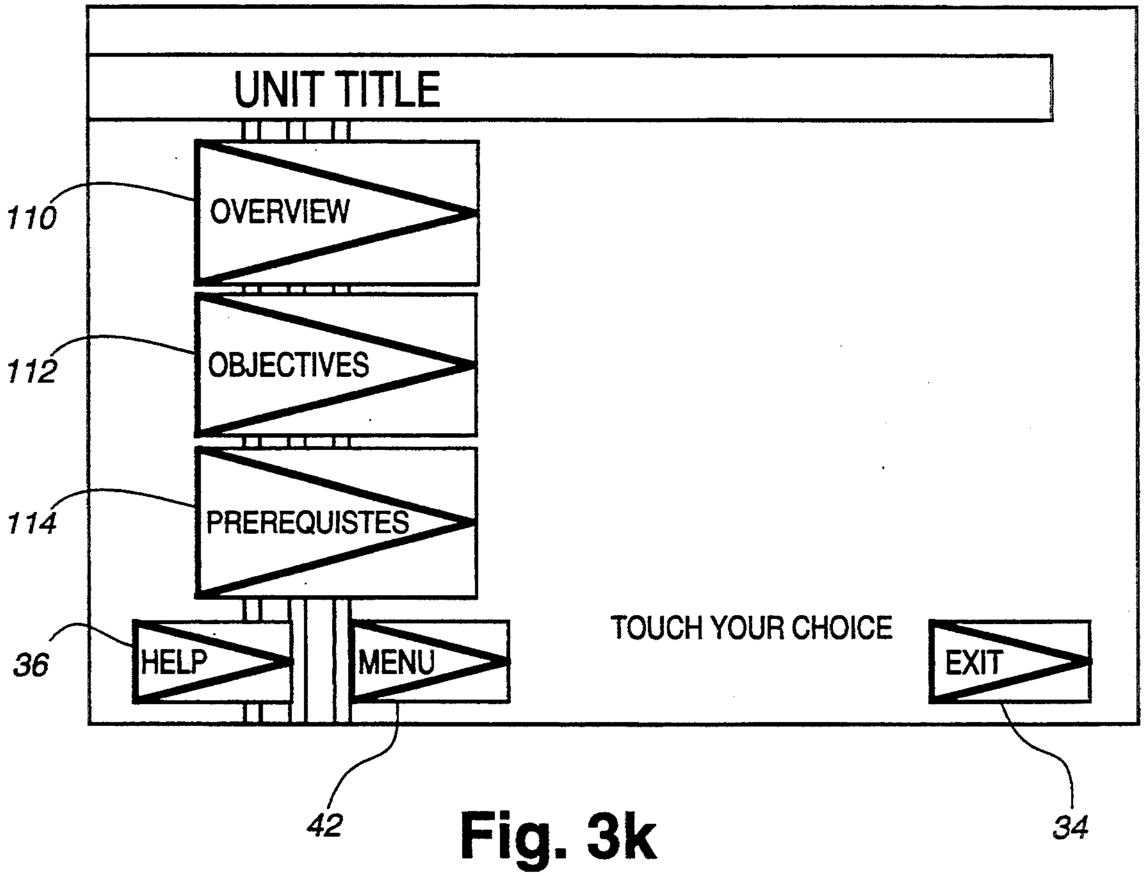

Once the full video on the selected topic has been displayed by the step 96, control passes to the step 60, which in turn causes the screen of FIG. 3*k* to be displayed. The student may select options by contacting the touch sensitive portions 34, 36 or 42, or may cause control to be passed to the syntax analyzer step 108 by contacting any one of three touch sensitive portions 110, 112 or 114. If the touch sensitive portion 110 is contacted, the syntax analyzer 108 causes an introduction screen for a placement test to be displayed. Alternatively, if the portion 112 or the portion 114 is contacted, the syntax analyzer 108 causes a screen for a mastery test or a screen displaying scores of previously conducted tests to be developed.

Once testing is completed, the student may: (1) return to the unit menu step 34 by contacting the touch sensitive portion 42; (2) request help by contacting the touch sensitive portion 36; or (3) exit the program by contacting the touch sensitive portion 34.

Referring again to FIG. 3*b*, the testing step 60 may be accessed by the student directly by contacting the touch sensitive portion 50, if desired.

As also seen in FIG. 3*b*, if the student contacts the touch sensitive portion 48, control passes to a portion of the program referred to as the "reference center." The reference center allows the student to look up a specific topic, view reference text on that topic from a variety of perspectives (i.e., details, syntax, examples, etc . . . ) and link directly to a syntax anaylzer practice problem on that topic. The step 58 causes the screen of FIG. 4*a* to be displayed, wherein a student may select a topic of his choice using the keyboard 22. The student may alternatively request help from the system 10 or return to the point from which control passed to the step 58. These options are also available to the student when the screens of FIGS. 4*b* and 4*c* are displayed. Once a topic is selected by the student, control passes to a step 120, which in turn causes the screen of FIG. 4*b* to be displayed. The student can then select an individual subject for review or select a return to the screen of FIG. 4*a*. Once the student has selected a subject, control passes to a step 122, which in turn causes a screen, such as the screen of FIG. 4*c*, to be displayed providing information on the selected subject. If desired, the student may copy any or all of the information on the screen of FIG. 4*c* to the clipboard 109, if desired. Further, the student may select context sensitive help or branch to other portions of the program, for example to the syntax analyzer 108 or to the subtopic index 120. Alternatively, the student may select "go to video" and branch to the block 96. This causes audio and video information on the topic selected in the reference center to be displayed.

As noted above, the student may store any information from the reference center and/or any rules and hints provided by the syntax analyzer 108 on a removable diskette as an ASCII file using the clipboard 109 so that the student may view the stored information at a later time and at a different location. For example, the student can use any word processing program capable of reading an ASCII file to review, print or alter the information as desired.

Although a particular interrelationship between the modes of instruction has been described in detail, various instruction formats could be utilized. One such instruction format is described in a pending patent application entitled "Interactive Learning System," U.S. Ser. No. 07/765,563, filed Sep. 25, 1991, the disclosure of which is incorporated herein by reference.

In an alternative embodiment, the instruction provided by the syntax analyzer 108 of the system may be provided separately, without any other modes of instruction being provided. In that embodiment, the syntax analyzer routine may be used alone or in connection with traditional classroom instruction.

The Syntax Analyzer Routine

As described above, the syntax analyzer routine 108 schematically shown in FIG. 2 allows the student to test, practice or reinforce the knowledge gained through the video and reference modes of instruction by attempting to answer questions posed in problems relating to the instruction received.

In this mode of instruction, the student may attempt to answer questions presented in problems relating to the subject matter for which instruction is being provided. The student entries made in response to a question are analyzed, and the system provides the student detailed feedback information regarding those entries. The feedback information includes rule and hint information and visual information provided by an arrow indicator which moves along the student's entry in synchronism with the token-by-token analysis (described below) of the entry. If an error is found in the entry, the arrow indicator stops, thus indicating the location of the error, and changes color. If an error is found, a hint or rule associated with the error is generated on the student's display.

If the student makes an error, he or she can try to answer the same question again, and the syntax analyzer analyzes the new entry in the same manner. Thus, the student may make a number of errors in response to a question, and the syntax analyzer 108 will generate various hints or rules for each error in a stepwise fashion to help the student generate the correct answer.

A screen display 200 that is generated during the syntax analyzer routine is shown in FIG. 5. The display 200 includes a first portion 210 in which the text of problems is presented to the student, a second portion 220 where rules and hints are displayed to the student, and an upper third portion 230 in which the student's entry and the arrow indicator (not shown) which moves along that entry appear.

The system 10 generates a unique display like the one shown in FIG. 5 for each problem presented to the user.

The data that controls the generation of the displays 200 is described below.

Data Format Of Problems

Each problem that the system 10 presents to the student is generated from a respective data file stored in the ROM 14 or input via a disk drive. Such a data file is referred to herein as a "problem definition file." Each problem definition file (PDF) comprises a number of data fields, which are illustrated in FIG. 6, that completely define the problem.

Referring to FIG. 6, each PDF field begins with a field identifier and is followed by variable-length data field. The data fields in the problem definition files generally appear in the same order in which they are shown in FIG. 6.

A problem identification field, which uniquely identifies each problem generated by the system 10, is identified by "<problem-id>" and is followed by an alphanumeric string, such as "Problem33."

A problem prompt field begins with the identifier "<problem-prompt>" and is followed by the text of the problem that is to be generated on the visual display 20. This text would normally include some background information and the particular question that the student is to answer.

A prompt line data field begins with the identifier "<prompt-line>" and is followed with a number specifying the video line on the display device 20 in which the student's answer is to appear.

A token data field may begin with one of ten different field identifiers and is followed by a single entry consisting of a number of alphanumeric characters, a multiple entry, or no entry at all. A number of token data fields are typically used in the PDF to specify various characters or character strings, referred to herein as "tokens," that make up the answer to the question presented to the student. The tokens specified in the PDF must appear in the same order in the student's answer in order for that answer to be considered correct.

The "<token>" identifier means that the single entry that follows is a required part of the answer, and must be found in the student's entry. The single entry may comprise one or more alphanumeric characters.

The "<token, same-order>" identifier means that each of the multiple entries that follows is a required part of the student's answer, and that those entries must be found in the same order in the student's answer in which they appear in the token. For example, assume the answer to a question presented to the student is the programming instruction "DIVIDE X, Y, Z" which causes the program to divide the variable X by the variable Y and place the quotient in the variable Z. Thus, if the tokens X, Y and Z do not appear in the same order in the student's answer, the program would not calculate the proper result. The same-order token for specifying X, Y and Z in the PDF would be "<token, same-order> X Y Z".

An any-order token is identified by the "<token, any-order>" identifier and means that each of the multiple entries that follows must be found in the student's answer, but that they may be found in any order. For example, for the computer program instruction "PRINT X, Y, Z", which would print out the numeric values of the X, Y and Z variables, an any-order token would be used for the X, Y and Z variables since the order in which they appear in the student's answer does not matter in that all three variables are still printed out, regardless of the order.

A commutable type of token is identified by the "<token, commutable>" identifier, has three entries following it, and means that there are two permissible orders for those entries. One permissible order is the same order in which the three entries appear in the token, and the other permissible order is that the order of the first and third entries is reversed. An example of where a commutable token might be used is for the comparison "X=3". In that comparison, regardless of whether it appeared as "X=3" or "3=X", the result would be the same: the variable X would be tested to determine whether it was equal to three.

A one-of type of token begins with the "<token, one-of>" identifier and means that only one of a number of entries that follow the identifier must be found in the student's answer. This type of token may be used, for example, in a computer programming language that recognizes more than one character as specifying a function. Thus, when a concatenate instruction can be represented by either " || " (the concatenate symbol) or "+" (the addition symbol), the token in the PDF would be "<token, one-of> || +".

An optional token is specified with the "<token, optional>" identifier and means that the single entry following the identifier is optional.

In some programming languages, the use of one optional character may cause another character to be required. For example, in some languages a pair of parentheses around an expression are optional. However, if the student uses an opening parenthesis, the entry will not be considered correct unless there is a closing parenthesis, even though the opening parenthesis was optional.

An optional-contingent token would be used for the above entry. Such a token is specified with the "<token, optional, contingent>" identifier and means that if a previous entry in the student's answer was an optional token which required a second token, then the single entry following the optional-contingent token identifier must be found at a later point in the student's answer.

The use of an optional-contingent token is illustrated below for the instruction "X+Y" which is also considered correct where "X+Y" is enclosed in parentheses. The token sequence in the PDF for the above example would be as follows:

```
<token, optional> (
<token, same-order> X + Y
<token, optional, contingent> )
```

The final three types of tokens shown in FIG. 7 relate to whether or not spaces are allowed at particular points in a student's answer. Each of these tokens includes only the token identifier and does not have any entry following it. The "<token, space, required>" identifier means that a space must appear at that point in the student's answer. The "<token, space, allowed>" identifier means that spaces are permitted after that point in the student's answer, and the "<token, space, not-allowed>" identifier means that no spaces are permitted after that point in the student's answer. If no token relating to whether spaces are permitted is provided in the PDF, the system defaults to spaces-allowed.

In a PDF, each token of the type described above is immediately followed by a rule field and a hint field. The purpose of the rule field is to give the student feedback regarding any error in the student's entry, and the hint field is used to give the student a hint if he or she is having difficulty completing the entry.

The rule field may begin with one of two identifiers: "<rule>" or "<rule, file>." If the "<rule>" identifier is used, it is followed by the text of a rule associated with the token immediately preceding the rule; if the "<rule, file>" identifier is used, it is followed by the name of a data file and the part of the file where the rule is located. The hint field is analogous to the rule field, except that it specifies a hint associated with the previous token instead of a rule.

An answer field is used for the purpose of displaying the correct answer to the student if requested by the student. The answer field begins with the "<answer>" identifier and is followed by the answer to the question presented to the student. If there is more than one correct answer, the preferred answer may be specified.

A data display field is sometimes used when additional data is to be presented to the student via the visual display 20 before the student attempts to answer the question posed by the problem. For example, if the student is learning an application program relating to databases, and needs access to the data contained in a database to answer the question, the contents of the database or a portion thereof are specified in the data display field. That data is then displayed on the display device 20 pursuant to a request by the student.

The data display field begins with one of two possible identifiers, "<data>" or "<data, file>". If the "<data>" identifier is used, it is followed by the text of the data to be presented to the student. If the "<data, file>" identifier is used, it is followed by the name of a data file and the location in that data file from which the data is to be retrieved.

A comment field, which is optional, may be used to provide documentation relating to the problem. The documentation, which is not used during operation of the system, may consist of the author of the particular problem and when it was written, or any other comments.

An end-of-problem field is used to mark the end of each problem and consists of the "<eop>" field identifier.

An example of the contents of a PDF is illustrated in FIG. 7. The PDF shown therein is for the problem presented on the display illustrated in FIG. 5. It should be appreciated that the contents of each PDF file depends on the particular syntactical rules associated with the computer programming language for which instruction is being provided.

The interactive learning system in accordance with the invention may be used to provide instruction for a great number of different computer programs or other syntax-intensive subject matters. For each computer program for which the system is to provide instruction, the PDF files for each problem to be presented to the student should be authored by a person familiar with that computer program. This is a relatively straightforward task given the definitions of the PDF field types set forth herein.

An important advantage in the architecture of the interactive learning system is that its operation is independent of any particular computer programming language for which instruction is to be provided. The system is capable of given instruction and analyzing the syntax of student entries for any computer program or subject matter, regardless of its particular syntactical rules, as long as the problem definition files are specified.

Moreover, specification of the problem definition files allows the instruction and problems for each programming language to be customized. The number of problems can be varied, the text of the problems can be specially selected, and the rules and hints provided in connection with the problems can be customized.

Analysis of Student Entries

A syntax analyzer routine 108 that analyzes the syntax of student entries, in accordance with the problem definition files, is illustrated in FIGS. 8*a*–8*d*. As described above, the syntax analyzer routine 108 is independent of the particular programming language or subject matter being presented in that it has the capability to analyze the syntax of various programming languages. The only requirement is that the problem definition files for that programming language are provided.

The general manner in which the syntax analyzer routine 108 operates is as follows. After the text of a problem specified in the problem-prompt field of the PDF for that problem has been presented on the student's visual display 20, the routine 108 may be invoked in two different ways.

The routine 108 may be invoked when the student types in an answer in response to the question presented and hits the "Return" key. In this case, the syntax analyzer routine 108 analyzes the student's entry by parsing it into tokens, and comparing the order of the tokens in the student's entry with the order of the tokens in the PDF. As the routine 108 is making this token-by-token comparison, a visual arrow is generated on the display 20 and points to the token in the student's entry which is currently being analyzed. If the student's entry is correct, the routine generates a message to the student indicating that. If the student's entry is incorrect, the visual arrow on the display stops at the point at which the error occurred, and the system generates a message on the display 20 containing the text of the rule associated with the error in the student's entry.

The syntax analyzer routine 108 may also be invoked when the student requests a hint. In this case, the student would type in as much of the answer as possible, but instead of pressing the "Return" key, he or she would press the "Hint" key. In this case, the routine would analyze the student's entry in the same token-by-token manner, but when the end of the incomplete entry was found, the routine would generate the hint associated with the token that the answer should contain.

A token in a student entry may be either a single-character token, a double-character token, or a multi-character token. A single-character token may include any of the following symbols:

| | | | |
|---|---|---|---|
| " | (double quote) | % | (percent symbol) |
| ' | (single quote) | ( | (opening parenthesis) |
| ) | (closing parenthesis) | * | (multiplication symbol) |
| + | (addition symbol) | , | (comma) |
| . | (period) | / | (division symbol) |
| ; | (semicolon) | < | (less-than symbol) |
| = | (equal sign) | > | (greater-than symbol) |
| \|\| | (concatenate symbol) | ¬ | ("not" symbol) |
| — | (minus or subtraction symbol) | | |

A double-character token may be either <=(less-than-or-equal-to symbol) or >= (greater-than-or-equal-to symbol).

Multi-character tokens may be any combination of uppercase or lowercase letters, all decimal digits, a question mark (?), underscore character (_), and a period when used at the end of the multi-character token or as a decimal point. A multi-character token is considered to end when it is followed by any character not in the set of characters defining it. This terminating character is typically a space or a comma.

If a period is used in a multi-character token, the system interprets it as the end of the token if any character in a multi-character token is a letter or underscore. If all of the characters in the multi-character token are numerals, the system will interpret the period as a decimal point.

The above description of the definition of tokens as used in the interactive learning system is for exemplary purposes only, and tokens could be defined in other manners without sacrificing the benefits conferred by the invention.

Figure 8A:
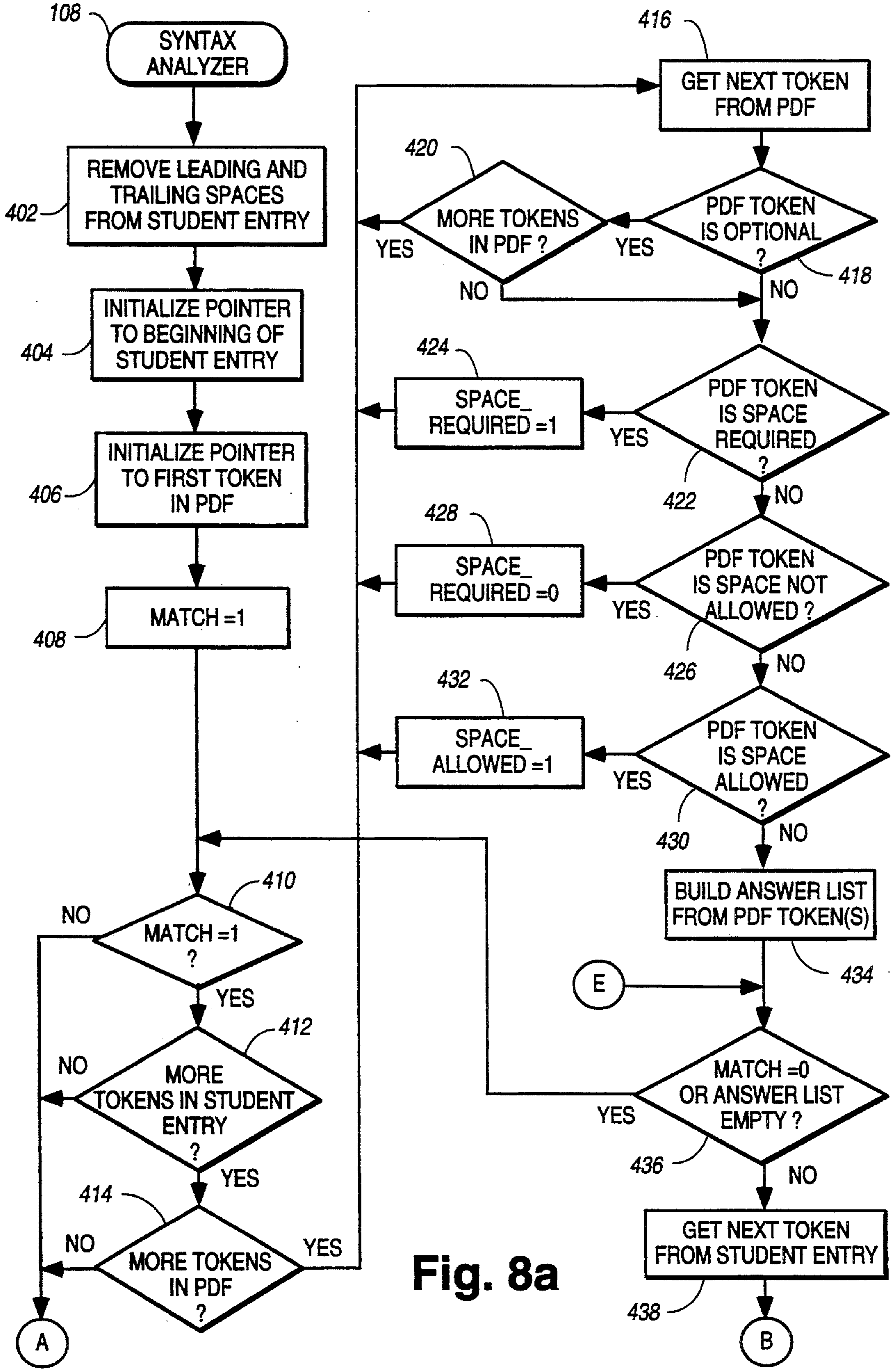
FIGS. 8*a*–8*d* are a flowchart of the operation of a syntax analysis routine executed during operation of the system.

A detailed description of the syntax analyzer routine 108 follows. Referring to FIG. 8*a*, at step 402, any leading and trailing spaces in the student entry are removed. At step 404, a pointer is initialized to the beginning of the student entry, and at step 406, a pointer is initialized to the first token in the PDF for the current problem. At step 408, a MATCH variable is set to one. The MATCH variable indicates whether or not the student's entry is correct for the portion of the entry that has been analyzed. The MATCH variable is initialized to one to indicate that the student entry matches the PDF answer, and is set to zero when there is an incorrect token in the student's entry.

Steps 410–414 determine whether the student's entry should be analyzed any further. The analysis is terminated if a mistake has been made in the student's entry as determined in step 410, if there are no more tokens in the student entry as determined in step 412, or if there are no more tokens in the PDF as determined in step 414. If the analysis is terminated for any of those reasons, the routine branches to step 510 of FIG. 8*d*.

If the syntax analysis is not terminated, the routine branches to step 416, where the next (or first) token in the PDF file for the current problem is retrieved.

At step 418, if the token retrieved from the PDF is an optional token, then the routine branches to step 420, which determines whether there is another token in the PDF. If there is, the routine branches back to step 416 where the next token is retrieved from the PDF.

The reason for getting the next token in the PDF file when the current token is an optional token is that the student's entry may not include the optional token, but instead may start with the first required token. In this case, if only the optional token were retrieved from the PDF, the student token would not match, and the routine would (incorrectly) determine that the student's entry was not correct.

Steps 422, 426 and 430 check to determine whether the token retrieved from the PDF is one of the three tokens used for specifying whether spaces can appear in the student's entry, referred to herein as "space-control" tokens. At step 422, if the PDF token is a space-required token, the routine branches to step 424 where a SPACE_REQUIRED variable is set to one. The routine then branches back to step 416 where the next token is retrieved from the PDF.

The next PDF token is retrieved because the space-control tokens in the PDF do not include any entries following their field identifiers. Thus, when the first token in the student entry is retrieved, there will be no PDF token to compare it with.

In the PDF, a space-control token is always followed by another token since such a token controls the spacing between tokens that follow it. For this reason, if a space-control token is detected at step 422, the routine does not need to branch to step 420 to determine whether there is another token in the PDF.

At step 426, if the current PDF token is a space-not-allowed token, the routine branches to step 428 where a SPACE_ALLOWED variable is set to zero to reflect the fact that future tokens in the student's entry may not have spaces between them. The routine then branches back to step 416 where the next PDF token is retrieved.

At step 430, if the current PDF token is a space-allowed token, the routine branches to step 432 where the SPACE_ALLOWED variable is set to one to reflect the fact that spaces are allowed between future tokens in the student's entry.

At step 434, an answer list is built from the PDF token or tokens retrieved during step 416. The answer list is built by simply storing the single entry or multiple entries that followed the field identifier for the PDF token. These single or multiple entries stored on the answer list are hereinafter referred to as "tokens" or "answer list tokens."

One instance in which the answer list would be built from multiple PDF tokens is where the first such token was an optional token. In that case, the answer list would contain the entry following the field identifier for the optional token and the entry or entries following the field identifier for the next PDF token.

In building the answer list, the routine treats commas specially in certain circumstances. In such cases, commas in the PDF are not considered to be tokens (and commas do not appear in the entries following the token field identifiers in such cases), but are considered to be tokens in the student's entry. For example, for the same-order and any-order tokens, a comma is required to separate the multiple entries following each of the token identifiers for those tokens. The routine treats the commas in the student's entry as tokens. However, no commas are included in the answer list. The routine checks for the existence of the commas required in the student's entry by periodically setting and resetting a COMMA_REQUIRED flag, which as described in detail below, determines when the student's entry should be a comma.

At step 436, the routine determines whether there has been an error in the student's entry (when MATCH=0) or whether the answer list is empty. In either case, the routine branches back to steps 410–414, where either the routine will terminate or where the next PDF token will be retrieved.

If the answer list is not empty as determined at step 436, the routine branches to step 438 where the next (or first) token in the student's entry is retrieved.

Figure 8B:
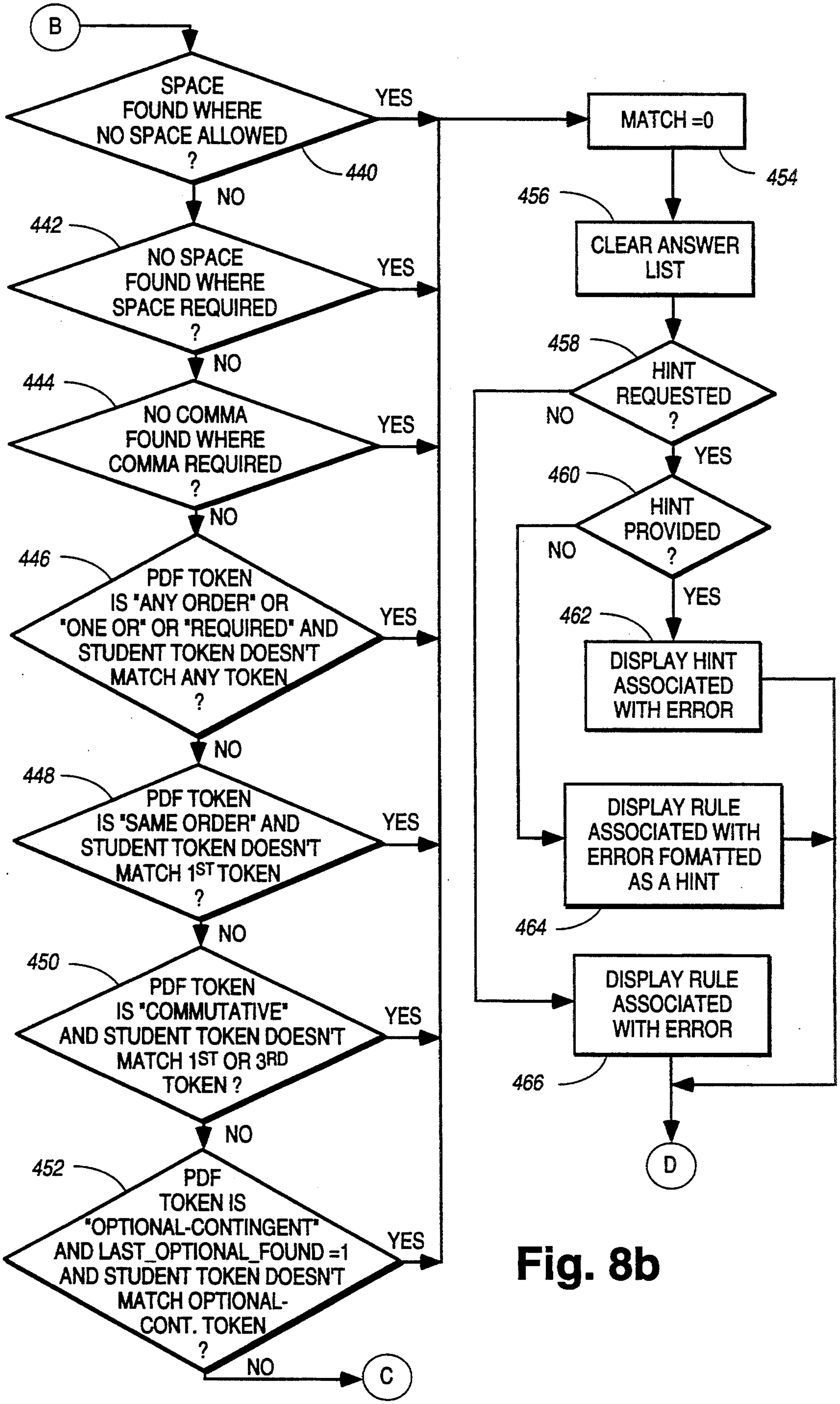

Referring to FIG. 8*b*, the routine then branches to steps 440–452. At these steps, the routine compares the student token retrieved at step 438 with the tokens on the answer list built at step 434 to determine whether there is a match.

There are seven different possible errors that may occur. At step 440, the routine checks to determine whether there was a space found in the student entry when no space was allowed (as indicated by the current status of the SPACE_ALLOWED flag). If this condition is true, the routine branches to step 454.

At step 442, the routine checks to determine whether the student entry failed to include a space where a space was required (as indicated by the current status of the SPACE_REQUIRED flag). If this condition is true, the routine branches to step 454.

At step 444, the routine checks to determine whether the student entry failed to include a comma where a comma was required (as indicated by the current status of the COMMA_REQUIRED flag). If this condition is true, the routine branches to step 454.

At step 446, the routine checks to determine whether the current PDF token is an any-order token or a one-of token and the student token does not match any of the tokens on the answer list, or whether the PDF token is a required token (indicated by the field identifier "<token>") and the student token does not match that token. If either condition is true, the routine branches to step 454.

At step 448, the routine checks to determine whether the PDF token is a same-order token and the student token does not match the first token on the answer list. If this condition is true, the routine branches to step 454.

At step 450, the routine checks to determine whether the PDF token is commutable, and the student token does not match either the first or third token on the answer list. If this condition is true, the routine branches to step 454.

Finally, at step 452, the routine determines if the PDF token is an optional-contingent token, if a LAST_OPTIONAL_FOUND flag is one (as set at steps 476 and 480 described below), and if the student token did not match the optional-contingent token. If these conditions are true, it means that a previous student token was an optional token that required a second token, and that the student failed to include that token in the entry. In that case, the routine branches to step 454.

Step 454, to which the routine branches if any error was detected in the student entry as determined in steps 440-452, sets the MATCH flag to zero to reflect the fact that the student entry contains an error, and at step 456, the answer list is cleared.

The purpose of steps 458-466 is to display either a hint or a rule that is associated with the error in the student entry. At step 458, the routine determines whether a hint was requested by checking the status of a HINT flag (the value of which is one if the student pressed the "Hint" key or zero if the student pressed the "Enter" key after making the entry).

If a hint was requested, the routine branches to step 460 where it checks to determine whether a hint was provided for the current PDF token. Although a hint is usually provided, it may not be. If no hint is provided, the routine branches to step 464 where it instead displays the rule associated with the error formatted as a hint (e.g., hints begin with "Hint:" see FIG. 5). If there is a hint provided, at step 462 the hint associated with the error is displayed.

If a hint was not requested at step 458, meaning that a rule was requested, the routine branches to step 466 where the rule associated with the error is displayed on the display 20.

Determining the hint or rule associated with the error may be accomplished in one of two ways. For an error of the type detected in steps 440-444, the specific text of the hint or rule may be "hard-coded" directly in the computer program, a specific hint and rule being associated with each of steps 440, 442, 444. For an error of the type detected in steps 446-452, the hint or rule in the PDF file associated with the current PDF token may be displayed. For example, referring to FIG. 7, if the current PDF token is "*" and the student does not input that token correctly, the rule (or hint) stored in the rule field (or hint field) immediately following the PDF token "<token>*" would be displayed.

Figure 8C:
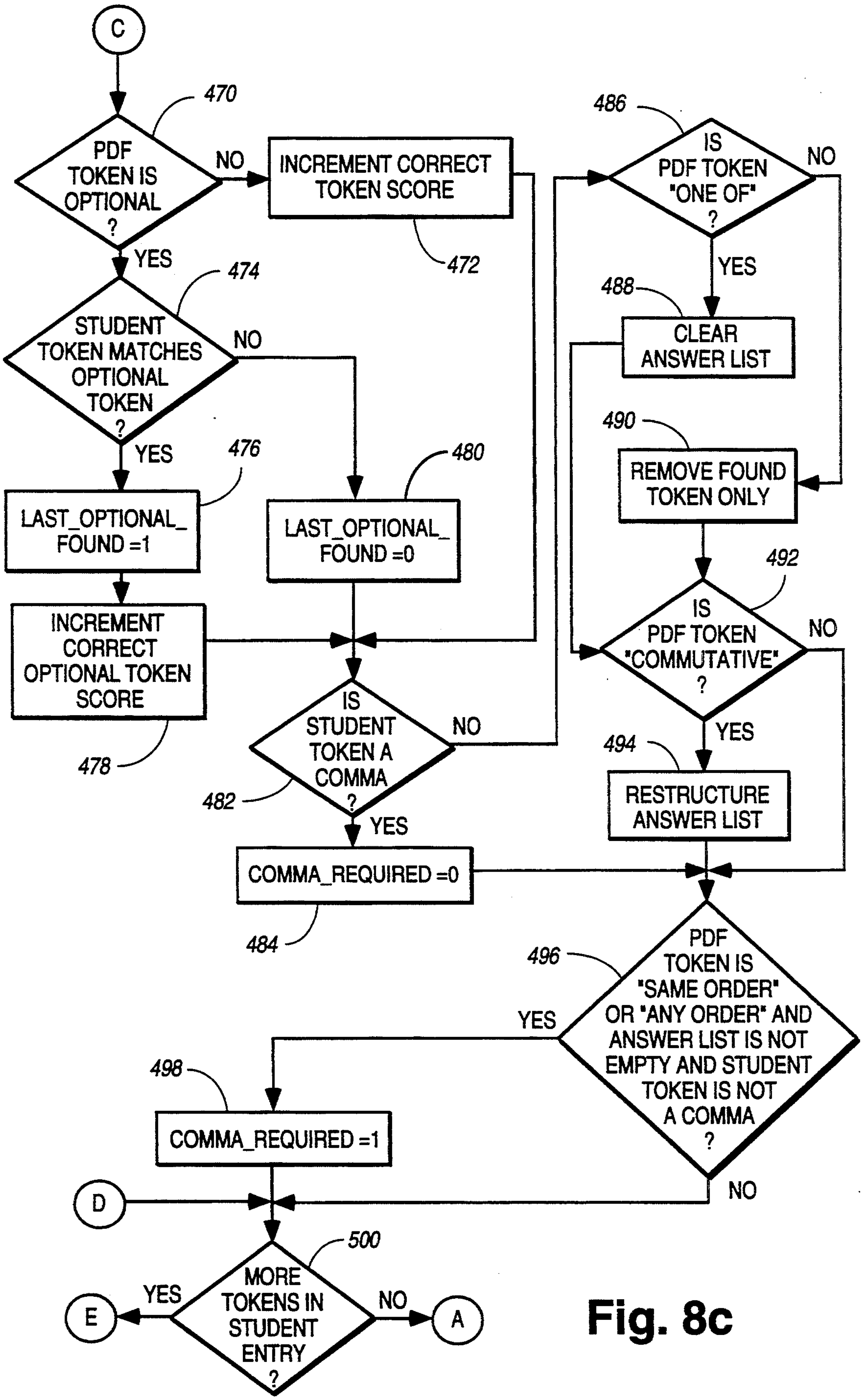

If there was no error in the student token as determined in steps 440-452, the routine branches to step 470 shown in FIG. 8*c*. Referring to FIG. 8*c*, at step 470 the routine determines whether the first PDF token in the answer list is an optional PDF token, which in this step include both optional and optional-contingent tokens. If the PDF token is not an optional token, the routine branches to step 472 where the correct token score is incremented.

If the PDF token is an optional token as determined at step 470, the routine branches to step 474, where it determines whether the student token matched the optional PDF token. If so, the routine branches to step 476 where the LAST_OPTIONAL_FOUND flag is set to one, and to step 478 where the correct optional token score is incremented.

If the student token did not match the optional PDF token, then the routine branches to step 480 where the LAST_OPTIONAL_FOUND flag is set to zero.

As a result of the above steps, if a student token matches an optional token (step 474, LAST_OPTIONAL_FOUND=1) and that optional token in PDF is followed by an optional contingent token, the student entry must contain the token specified by the optional-contingent token (as tested for at step 452).

At step 482, if the student token is a comma, the routine branches to step 484 where the COMMA_REQUIRED flag is set to zero. If the student token is not a comma, the routine branches to step 486 where the routine determines whether the current PDF token (for which there was a match) is a one-of token. If it is, meaning that the student token only had to match one of the tokens on the answer list and that match occurred, then the answer list is cleared at step 488. If the PDF token for which there was a match was not a one-of token (meaning that it was a required, same-order, any-order, commutable, optional, or optional-contingent token), the routine branches to step 490 where only the PDF token for which there was a match is removed. For example, assume the current PDF token is "<token, same-order>X Y Z", which would generate three tokens on the answer list: X, Y and Z. If the student token was "X" thus matching the first token on the answer list, only the "X" on the answer list would be removed.

At step 492, if the PDF token for which there was a match was a commutable token, the answer list for that token is restructured by respecifying the token as a required token and possibly by rear-ranging the order of the tokens on the answer list.

This step 492 is only performed once for each commutable token upon the initial match of either the first or third entries on the answer list. There are two possible circumstances when step 492 is performed. In one case, the student token could have matched the first token of the three tokens on the answer list. In this case, the commutable token is respecified to be a same-order token, meaning that the next two student tokens must be in the same order as the last two tokens in the original commutable token.

In the other possible case, the student token could have matched the third token on the answer list. In this case, the commutable token is again respecified to a same-order token, but the answer list is restructured by switching the order of the remaining two tokens (the third token on the answer list having been removed at step 490).

As an example of the latter case, assume that the original commutable token was the following: "<token, commutable>X=3" and that the student token was "3". In this case, the "3" would be removed from the answer list at step 490, and at step 494 the remaining two tokens would be reordered, with "=" appearing first and "X" appearing second, and the token would be respecified to same-order, meaning that the student entry is required to have "=" and "X" in that order.

As described above, commas, although required for the multiple-entry tokens shown in FIG. 6, are not included in the answer list. Instead, the presence of commas in a student's answer is tested via the COMMA_REQUIRED flag. This-flag is set to zero, or turned off, each time a comma is detected in the student's answer (in steps 482, 484 of FIG. 8*c*) and turned on when the previous student token was not a comma and when a comma is required for the next student token.

The latter condition is detected at step 496, which determines when the current PDF token is a same-order or any-order token, the answer list is not empty, and the current student token is not a comma. If all three of these conditions are satisfied, the next student token must be a comma, and the COMMA_REQUIRED flag is set to one.

At step 500, if there is another token in the student entry, the routine branches back to step 436 (FIG. 8*a*), where the routine determines if the answer list is empty. If the answer list is not empty, the next student token is retrieved (at step 438 of FIG. 8*a*) and the entire process above repeats. Whenever the answer list is empty, the next PDF token is retrieved.

The process continues until an error is detected in the student entry, until there are no more tokens in the student entry, or until there are no more tokens in the PDF, all as determined at step 414 of FIG. 8*a*. In any of these conditions is present, the syntax analysis terminates and the routine branches to step 510 shown in FIG. 8*d*.

Figure 8D:
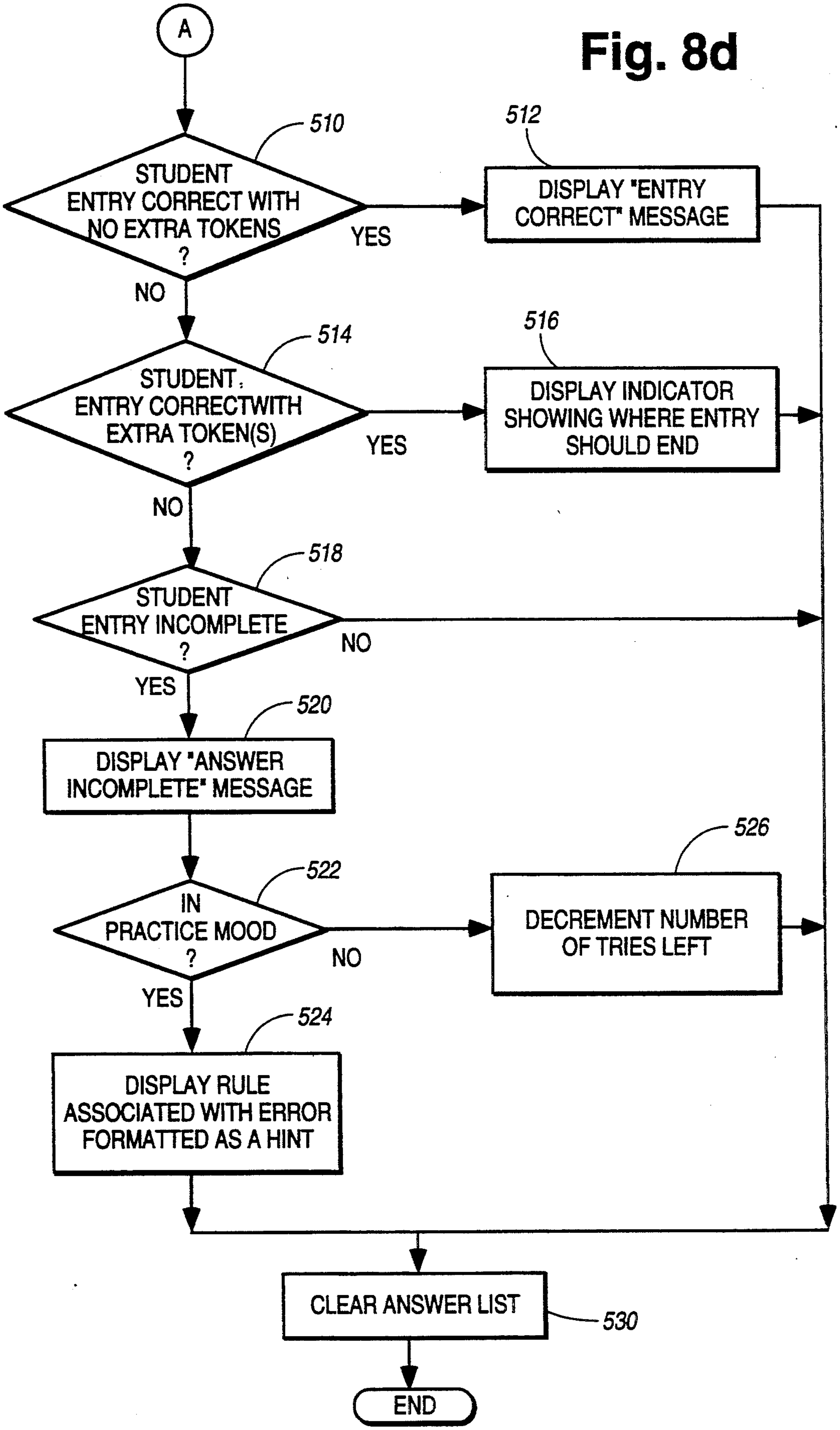

Referring to FIG. 8*d*, at step 510, if the student entry was correct with no extra tokens, meaning that there were no extra tokens in the student entry, the routine branches to step 512 where a message is generated on the display 20 that the student entry was correct.

At step 514, if the student entry was correct with extra tokens, the routine branches to step 516 where it causes a "bar" indicator to appear on the display next to the student entry to indicate where that entry should have ended.

At step 518, if the student entry was incomplete, the routine branches to step 520 where it displays an "answer incomplete" message. The system 10 has two modes of operation available to the student, a practice mode and a testing mode. At step 522, if the student is in the practice mode, the routine branches to step 524 where a rule associated with the token that should have appeared next in the student answer is displayed. If the student is in the testing mode, the routine branches to step 526 where the number of attempts at answering the question presented to the student is decremented. At step 530, the answer list is cleared.

At step 518, if the student entry was not incomplete, and did not satisfy any of the circumstances tested for in steps 510 and 514, the student entry contained an error for which a rule or hint was already displayed at steps 462–466.

Example Illustrating a Portion of the Operation

The operation of the syntax analyzer routine 108 with respect to commas is illustrated with the following example. Assume that the correct entry to the question presented to the student is "X, Y, Z"; that the student makes the entry correctly; and that the token specifying that entry is "<token, same-order>X Y Z".

In this example, the routine will retrieve the PDF token at step 416 (FIG. 8*a*), build the answer list at step 434 (the answer list will contain the three letter tokens but not any commas as tokens), and retrieve the first token in the student entry, "X" at step 438. Since the student token "X" matches the first token "X" on the answer list, the routine will eventually branch to step 470 (FIG. 8*c*). At step 482, since the student token ("X") is not a comma, the routine will skip step 484 and branch to step 486 and 490, where the found token "X" will be removed from the answer list.

The routine will then proceed to step 496. In this case, since the PDF token is a same-order token, the answer list is not empty (still containing "Y" and "Z"), and the current student token is not a comma (it is "X"), the routine will branch to step 498 where the COMMA_REQUIRED flag will be set to one. As a result, the routine will require the next student token to be a comma, as tested at step 444 of FIG. 8*b*.

The routine will then proceed to steps 500, 436 and 438 (FIG. 8*a*), where it will retrieve the next token in the student entry, which is a comma. The routine will then proceed through the steps 440–452 (not satisfying step 444 since the student token was the requisite comma) to step 470, and eventually to step 482. At step 482, since the current student token is a comma, the routine will branch to step 484, where the COMMA_REQUIRED flag will be reset to zero. The routine then proceeds to step 500, to step 436 (FIG. 8*a*) and to step 438, where the next student token ("Y") is retrieved. The above process will continue, with the COMMA_REQUIRED flag being set to zero when each of the two commas in the student entry is retrieved and being set to one each time a non-comma token in the student entry is retrieved. Thus, the above process requires every other token in the student entry to be a comma.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed:

1. An interactive learning system for providing feedback to a user regarding entries made by the user in response to questions generated by the system, comprising:

means for providing interactive audiovisual instruction to a user about a syntax-intensive subject matter;

input means for allowing the user to input data into said interactive learning system;

display means for generating displays of visual information;

means for generating a textual question prompt to the user for requesting the user to make a data entry relating to said subject matter into said interactive learning system;

means for analyzing said data entry made by the user to determine whether an error exists in said data entry; and means coupled to said analyzing means for causing said display means to generate an error display if an error exists in said data entry due to violation of a syntactical rule, said error display containing rule information associated with said error in said data entry made by the user, said rule information identifying said syntactical rule that was violated by said data entry.

2. An interactive learning system as defined in claim 1 wherein said analyzing means comprises:

memory means for storing a plurality of tokens relating to said data entry; and means for successively comparing said tokens stored in said memory means with portions of said data entry.

3. An interactive learning system as defined in claim 2 wherein said tokens are successively compared with portions of said data entry until either an error is found or the data entry has been completely analyzed.

4. An interactive learning system which is capable of analyzing user-input data entries relating to a syntax-intensive subject matter, said learning system comprising:

input means for allowing a user to input data into said interactive learning system;

display means for generating displays of visual information;

means for generating a textual question prompt to request the user to make a data entry relating to said syntax-intensive subject matter;

means for analyzing said data entry made by the user, said data entry relating to said syntax-intensive subject matter, said analyzing means comprising:

memory means for storing a plurality of tokens relating to said data entry; and means for successively comparing said tokens stored in said memory means with portions of said data entry; and means coupled to said analyzing means for causing said display means to generate an error display if an error exists in said data entry due to a violation of a syntactical rule, said error display containing rule information associated with said error in said data entry made by the user, said rule information identifying said syntactical rule that was violated by said data entry.

5. An interactive learning system as defined in claim 4 wherein said tokens stored in said memory means comprise:

a same order type of token which requires that a plurality of entries be found in a particular successive order; and an any order type of token which requires that a plurality of entries be found in any order.

6. An interactive learning system as defined in claim 4 wherein said tokens stored in said memory means comprise:

a commutable type of token which requires that three entries be found in one of two possible sequences; and a one of type of token which requires that one of two possible entries be found.

7. An interactive learning system as defined in claim 6 wherein each of said entries of said tokens comprises at least one ASCII character.

8. An interactive learning system as defined in claim 4 wherein said different subject matter areas comprises different computer programming languages.

9. An interactive learning system for presenting questions relating to a syntax-intensive subject matter to a user and analyzing user entries made in response to said questions, said interactive learning system comprising:

input means for allowing a user to input data into said interactive learning system;

display means for generating displays of visual information;

display means for generating a textual question prompt to request the user to make a data entry relating to said subject matter;

means for analyzing said data entry made by the user, said data entry relating to said subject matter, said analyzing means comprising:

memory means for storing a plurality of tokens relating to said data entry; and means for successively comparing said tokens stored in said memory means with portions of said data entry; and means for causing said display means to generate an error display if an error exists in said data entry due to a violation of a syntactical rule, said error display comprising textual information identifying said syntactical rule that was violated by said data entry.

10. An interactive learning system for providing feedback to a user regarding data entries made by the user in response to questions generated by the system, comprising:

means for providing interactive audiovisual instruction to a user about a syntax-intensive subject matter;

input means for allowing the user to input data into said interactive learning system;

display means for generating displays of visual information;

means for generating a textual question prompt to request the user to make a data entry relating to said subject matter into said interactive learning system;

means for analyzing said data entry made by the user to determine whether an error exists in said data entry; and means coupled to said analyzing means for causing said display means to generate an error display if an error exists in said data entry due to violation of a syntactical rule, said analyzing means having a first mode of operation and a second mode of operation, said error display containing, in said first mode of operation, rule information associated with said error in said data entry made by the user, said rule information identifying said syntactical rule that was violated by said data entry; and said error display containing, in said second mode of operation, hint information associated with said error in said data entry made by the user, said hint information suggesting why said data entry made by the user was erroneous.

11. An interactive learning system as defined in claim 10 additionally comprising a memory for storing a plurality of problem definition files, each problem definition file having a first data field containing electronic information representing a textual question prompt to be displayed to the user to request the user to make a data entry, a second data field containing electronic information representing a rule associated with said data entry, and a third data field containing electronic information representing a hint associated with said data entry.

12. An interactive learning system as defined in claim 10 wherein said analyzing means comprises:

a memory for storing a plurality of tokens relating to said data entries; and means for successively comparing said tokens stored in said memory with portions of said data entry.

13. An interactive learning system for providing feedback to a user regarding data entries made by the user in response to questions generated by the system, comprising:

means for providing interactive audiovisual instruction to a user about a syntax-intensive subject matter;

input means for allowing the user to input data into said interactive learning system;

a memory for storing a plurality of problem definition files, each problem definition file having a first data field containing electronic information representing a textual question prompt to be displayed to the user to request the user to make a data entry, a second data field containing electronic information representing a rule associated with said data entry, and a third data field containing electronic information representing a hint associated with said data entry;

display means for generating displays of visual information;

means coupled to said memory means for generating a textual question prompt to the user, based upon said electronic information contained in said first data field of one of said problem definition files in said memory, to request the user to make a data entry relating to said subject matter into said interactive learning system;

means for analyzing said data entry made by the user to determine whether an error exists in said data entry; and means coupled to said analyzing means for causing said display means to generate an error display if an error exists in said data entry due to violation of a syntactical rule, said analyze means having a first mode of operation and a second mode of operation, said error display containing, in said first mode of operation, rule information associated with said error in said data entry made by the user based upon said electronic information contained in said second data field in one of said problem definition files in said memory, said rule information identifying said syntactical rule that was violated by said data entry; and said error display containing, in said second mode of operation, hint information associated with said error in said data entry made by the user based upon said electronic information contained in said third data field of one of said problem definition files in said memory, said hint information suggesting why said data entry made by the user was erroneous.

14. An interactive learning system as defined in claim 13 wherein said problem definition files include a fourth data field containing a plurality of tokens relating to the data entry requested by said textual question prompt.

15. An interactive learning system as defined in claim 14 wherein said analyzing means comprises means for successively comparing said tokens stored in said fourth data field of one of said problem definition files with portions of said data entry.

16. An interactive learning system comprising:

input means for allowing a user to input data into said interactive learning system;

display means for generating displays of visual information;

means for generating a textual question prompt to request the user to make a data entry relating to a syntax-intensive subject matter;

means for analyzing said data entry made by the user, said data entry relating to said syntax intensive subject matter; and means for causing said display means to generate an error display if an error exists in said data entry due to a violation of a syntactical rule, said error display containing rule information associated with said error in said data entry made by the user, said rule information identifying said syntactical rule that was violated by said data entry.

17. An interactive learning system as defined in claim 16 additionally comprising a memory for storing a plurality of problem definition files, each problem definition file having a first data field containing electronic information representing a textual question prompt to be displayed to the user to request the user to make a data entry and a second data field containing electronic information representing a rule associated with said data entry.

18. An interactive learning system as defined in claim 16 wherein said analyzing means comprises:

a memory for storing a plurality of tokens relating to said data entry; and means for successively comparing said tokens stored in said memory with portions of said data entry.

* * * * *